(12) United States Patent
Yang et al.

(10) Patent No.: US 12,151,835 B2
(45) Date of Patent: Nov. 26, 2024

(54) FILM WRAPPING EQUIPMENT

(71) Applicant: WUXI LEAD INTELLIGENT EQUIPMENT CO., LTD., Jiangsu (CN)

(72) Inventors: Shengli Yang, Jiangsu (CN); Yizhou Sun, Jiangsu (CN)

(73) Assignee: WUXI LEAD INTELLIGENT EQUIPMENT CO., LTD., Jiangsu (CN)

( * ) Notice: Subject to any disclaimer, the term of this patent is extended or adjusted under 35 U.S.C. 154(b) by 0 days.

(21) Appl. No.: 18/071,686

(22) Filed: Nov. 30, 2022

(65) Prior Publication Data

US 2023/0159195 A1    May 25, 2023

Related U.S. Application Data

(63) Continuation of application No. PCT/CN2021/139168, filed on Dec. 17, 2021.

(30) Foreign Application Priority Data

Nov. 23, 2021 (CN) .......................... 202111390759.1

(51) Int. Cl.
*B65B 11/08* (2006.01)
*B65B 9/02* (2006.01)
(Continued)

(52) U.S. Cl.
CPC .............. *B65B 11/16* (2013.01); *B65B 9/026* (2013.01); *B65B 11/08* (2013.01); *B65B 11/54* (2013.01);
(Continued)

(58) Field of Classification Search
CPC ......... B65B 9/026; B65B 11/08; B65B 11/16; B65B 11/54; B65B 41/14; B65B 61/005; B65B 61/06
(Continued)

(56) References Cited

U.S. PATENT DOCUMENTS 3,449,889 A * 6/1969 Molitor, Jr. ........... B65B 61/005
53/374.6
3,490,194 A * 1/1970 Monaghan .............. B65B 9/026
53/493

(Continued)

FOREIGN PATENT DOCUMENTS

CN      202170022 U     3/2012
CN      106711490 A     5/2017
(Continued)

OTHER PUBLICATIONS

Chinese First Office Action of the Chinese application No. 202111390759.1, mailed on Apr. 18, 2023.
(Continued)

*Primary Examiner* — Stephen F. Gerrity
(74) *Attorney, Agent, or Firm* — Rivka Friedman

(57) ABSTRACT

The present application relates to a film wrapping equipment. The film wrapping equipment includes: a film wrapping assembly including two film wrapping rollers arranged opposite to each other in a first direction, and a film wrapping channel for a product to pass through formed between the two film wrapping rollers; a film pulling assembly arranged on one side of the film wrapping assembly in the first direction; a product loading assembly used to clamp the product and drive the product to pass through the film wrapping channel; and a strip cutting assembly used to cut off material strip located on two sides of the two film wrapping rollers in the first direction.

20 Claims, 17 Drawing Sheets

(51) Int. Cl.
  *B65B 11/16* (2006.01)
  *B65B 11/54* (2006.01)
  *B65B 61/00* (2006.01)
  *B65B 61/06* (2006.01)
  *H01M 10/04* (2006.01)

(52) U.S. Cl.
  CPC ............ *B65B 61/005* (2013.01); *B65B 61/06* (2013.01); *H01M 10/0404* (2013.01)

(58) Field of Classification Search
  USPC .............................. 53/220, 228, 370.4, 373.4
  See application file for complete search history.

(56) References Cited

U.S. PATENT DOCUMENTS

| | | | | |
|---|---|---|---|---|
| 3,897,675 | A | * | 8/1975 | Wilson .................. B65B 61/005 53/511 |
| 4,263,712 | A | * | 4/1981 | Schroder ............ H01M 50/466 29/730 |
| 4,858,416 | A | * | 8/1989 | Monaghan ............ B65B 61/005 53/553 |
| 5,383,326 | A | * | 1/1995 | Dean et al. ............. B65B 41/14 403/255 |
| 2019/0319225 | A1 | | 10/2019 | Kang |

FOREIGN PATENT DOCUMENTS

| | | | |
|---|---|---|---|
| CN | 207748581 | U | 8/2018 |
| CN | 110137578 | A | 8/2019 |
| CN | 209626337 | U | 11/2019 |
| CN | 111029639 | A | 4/2020 |
| CN | 111342104 | A | 6/2020 |
| CN | 211145264 | U | 7/2020 |
| CN | 211428286 | U | 9/2020 |
| CN | 212648283 | U | 3/2021 |
| CN | 212907826 | U | 4/2021 |
| CN | 213921632 | U | 8/2021 |
| CN | 214733119 | U | 11/2021 |
| JP | 06064627 | A * | 3/1994 |
| JP | 06179407 | A * | 6/1994 |
| WO | 03035479 | A1 | 5/2003 |

OTHER PUBLICATIONS

Chinese Second Office Action of the Chinese application No. 202111390759.1, mailed on Nov. 14, 2023.
International Search Report in International application No. PCT/CN2021/139168, mailed on Aug. 23, 2022.
Extended European Search Report in European application No. 21935451.1, mailed on Jul. 23, 2024.

* cited by examiner

FILM WRAPPING EQUIPMENT

CROSS-REFERENCE TO RELATED APPLICATION

The present application claims priority to a Chinese patent application with an application date of Nov. 23, 2021, an application number of "202111390759.1", and an application title of "FILM WRAPPING EQUIPMENT", which is incorporated by reference in the present application in its entirety.

BACKGROUND OF DISCLOSURE

Technical Field

The present application relates to a technical field of battery manufacturing, and more particularly, to a film wrapping equipment.

Description of Prior Art

In an industrial production process, it is often necessary to wrap products, that is, to wrap products with film materials. For example, in a lithium battery production line, for a battery cell after ultrasonic welding, two sides and a bottom surface of the battery cell need to be completely wrapped with adhesives. When adhering the adhesives, it is necessary to ensure that an adhering surface is flat without bubbles and clamping of the battery cell during an adhering process is reliable without looseness. In prior art, horizontal adhering is generally adopted, that is, the battery cell is placed horizontally in a fixture, and adhering of the battery cell is completed through a series of translation, reversing, and other actions, resulting in wrinkles forming easily and low adhesives wrapping accuracy.

BRIEF SUMMARY OF DISCLOSURE

Based on this, it is necessary to provide a film wrapping equipment to improve the above-mentioned defects in view of problems that film wrapping wrinkles easily and film wrapping accuracy is low in the current technology.

A film wrapping equipment, which comprises:
- a film wrapping assembly comprising two film wrapping rollers arranged opposite to each other in a first direction, and a film wrapping channel for a product to pass through being formed between the two film wrapping rollers;
- a film pulling assembly arranged on one side of the film wrapping assembly in the first direction and used to grab a material strip located on one side of the film wrapping assembly away from the film pulling assembly and pull the material strip along the first direction to move to one side of the film wrapping assembly facing the film pulling assembly, the material strip being a film for wrapping the product;
- a product loading assembly used to grab the product and drive the product to pass through the film wrapping channel; and
- a strip cutting assembly used to cut off parts of the material strip located on two sides of the two film wrapping rollers in the first direction.

In an embodiment of the present application, the film pulling assembly comprises a strip pulling moving seat and two strip clamping mechanisms both used to clamp the material strip; the strip pulling moving seat is controllably moved along the first direction, the two strip clamping mechanisms are arranged on the strip pulling moving seat at intervals along a second direction perpendicular to the first direction, and the two strip clamping mechanisms are configured to move close to each other or move away from each other along the second direction.

In an embodiment of the present application, the film pulling assembly further comprises a strip pulling lifting seat arranged on the strip pulling moving seat; the strip pulling lifting seat is movable relative to the strip pulling moving seat along a third direction, and the two strip clamping mechanisms are arranged on the strip pulling lifting seat; wherein the third direction is perpendicular to the first direction and the second direction.

In an embodiment of the present application, the two film wrapping rollers are configured to move close to each other or away from each other along the first direction.

In an embodiment of the present application, the film wrapping assembly further comprises a film wrapping driving member and a film wrapping transmission mechanism connected to the film wrapping driving member by transmission; and the film wrapping transmission mechanism is connected between the two film wrapping rollers by transmission, so that the two film wrapping rollers are driven by the film wrapping driving member to move close to each other or move away from each other along the first direction.

In an embodiment of the present application, the film wrapping transmission mechanism comprises a film wrapping fixed seat, a cam slot plate, two cam followers, and two film wrapping mounting seats; the film wrapping driving member is mounted on the film wrapping fixed seat, and the cam slot plate is mounted on an output shaft of the film wrapping driving member, so as to be driven by the film wrapping driving member to rotate; and
  the two film wrapping mounting seats are arranged close to each other or moving away from each other along the first direction, and the two film wrapping rollers are rotatably connected to the two film wrapping mounting seats around their own axes, respectively; and the two cam followers are mounted on the two film wrapping mounting seats, respectively and are cooperated with a cam slot on the cam slot plate by transmission, so as to drive the two film wrapping mounting seats to move close to each other or move away from each other along the first direction during a rotating process of the cam slot plate.

In an embodiment of the present application, the product loading assembly comprises a first product clamping mechanism and a second product clamping mechanism arranged opposite to each other in a third direction; and the film wrapping assembly is located between the first product clamping mechanism and the second product clamping mechanism, and the third direction is perpendicular to the first direction; and
  the first product clamping mechanism is used to clamp the product and insert the product into the film wrapping channel along the third direction; and the second product clamping mechanism is used to clamp the product passing through the film wrapping channel and pull the product out to an unloading position along the third direction.

In an embodiment of the present application, the first product clamping mechanism comprises a first lifting driving member, a first lifting seat, and a first clamping structure; the first lifting driving member is drivingly connected to the first lifting seat, so as to drive the first lifting seat to move along the third direction; and the first clamping structure is mounted on the first lifting seat and is used to clamp the product; and the second product clamping mechanism comprises a second lifting driving member, a second lifting seat, and a second clamping structure; the second lifting driving member is drivingly connected to the second lifting seat, so as to drive the second lifting seat to move along the third direction; and the second clamping structure is mounted on the second lifting seat and is used to clamp the product.

In an embodiment of the present application, the film wrapping equipment further comprises a product removal assembly, and the product removal assembly comprises a clamping sub-structure and a removal driving structure; the removal driving structure is drivingly connected to the clamping sub-structure, so as to drive the clamping sub-structure to move between the unloading position and a removal position, and the clamping sub-structure is used to clamp the product at the unloading position.

In an embodiment of the present application, the film wrapping equipment further comprises a waste material disposal assembly, and the waste material disposal assembly comprises a waste material suction mechanism and a motion driving mechanism; and the motion driving mechanism is drivingly connected to the waste material suction mechanism, so as to drive the waste material suction mechanism to move between a material suction position and a waste material collection position; and when the waste material suction mechanism moves to the material suction position, the waste material suction mechanism is located between the film wrapping assembly and the film pulling assembly, so as to suck a waste material formed after the strip cutting assembly cuts off the material strip; when the waste material suction mechanism moves to the waste material collection position, the waste material suction mechanism releases the waste material.

In an embodiment of the present application, the strip cutting assembly comprises a strip cutting moving seat, a strip cutting driving member, and a cutter mechanism; the strip cutting moving seat is movably arranged along a second direction perpendicular to the first direction; the strip cutting driving member is drivingly connected to the strip cutting moving seat; and the cutter mechanism is mounted on the strip cutting moving seat, so as to cut the material strip as the cutter mechanism moves with the strip cutting moving seat along the second direction.

In an embodiment of the present application, the cutter mechanism comprises a cutter fixed seat, a cutter quick removal seat, and a cutter; the cutter fixed seat is mounted on the strip cutting moving seat; the cutter quick removal seat is detachably connected to the cutter fixed seat; and the cutter is detachably connected to the cutter quick removal seat.

The above-mentioned film wrapping equipment, during actual film wrapping operation, firstly, the film pulling assembly moves along the first direction until a starting end of a material strip located upstream of the film wrapping assembly is clamped, and then returns along the first direction until the material strip is pulled over the film wrapping assembly to a downstream side of the film wrapping assembly. At this time, the material strip covers the film wrapping channel between the two film wrapping rollers. The product loading assembly clamps the product and drives the product to be inserted from an end of the film wrapping channel covered by the material strip. In a process of the product gradually passing through the film wrapping channel, the material strip is gradually adhered to a bottom surface and two opposite surfaces of the product under a rolling action of the two film wrapping rollers. When film wrapping is about to be completed, the strip cutting assembly cuts off the material strip located on the two sides of the above-mentioned two film wrapping rollers in the first direction, and then the product continues to pass through the film wrapping channel until it completely passes through the film wrapping channel, that is, the film wrapping is completed.

This way, the film wrapping equipment of the present application adopts a method of inserting the product between the two film wrapping rollers (i.e., vertical film wrapping method), during a film wrapping process, the two film wrapping rollers can continuously roll the material strip onto the product, and when the film wrapping of the product is about to be completed, the material strip is cut off by using the strip cutting assembly. During the film wrapping process, clamping is reliable without looseness, a film surface is flat without bubbles, wrinkles are prevented, and film wrapping accuracy is high.

Figure 1:
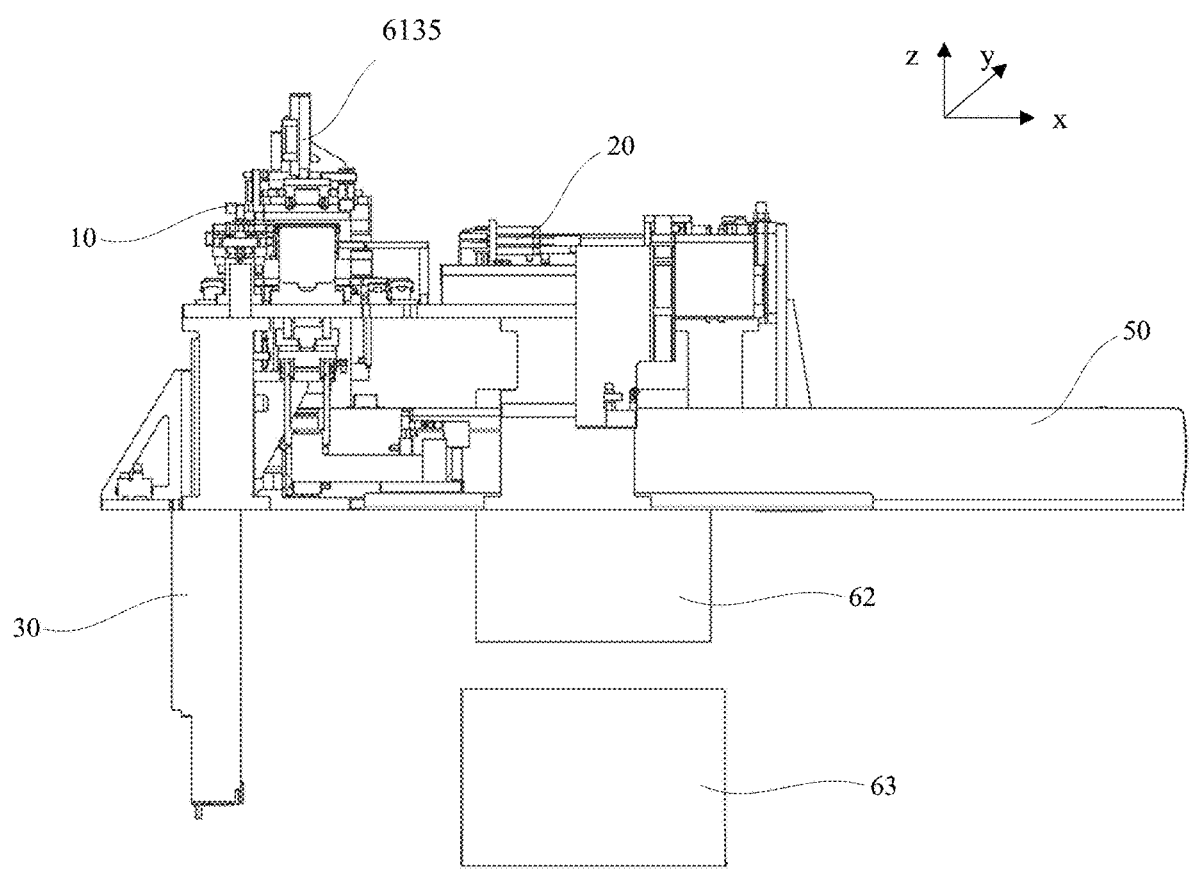
FIG. 1 is a front view of a film wrapping equipment in an embodiment of the present application.

For illustration, directional terms like first, second, and third directions used herein are shown in the figures, wherein: the reference character "x" represents a first direction, the reference character "y" represents a second direction, and the reference character "z" represents a third direction.

DETAILED DESCRIPTION OF PREFERRED EMBODIMENTS

In order to make the above objects, features, and advantages of the present application more obvious and understood, specific embodiments of the present application will be described in detail below with reference to accompanying drawings. In a following description, numerous specific details are set forth in order to provide a thorough understanding of the present application. However, the present application can be implemented in many other ways different from those described here, and those skilled in the art can make similar improvements without violating a connotation of the present application. Therefore, the present application is not limited by the specific embodiments disclosed below.

Terms "first" and "second" are only used for descriptive purposes and should not be understood as indicating or implying relative importance or implying a number of indicated technical features. Therefore, a feature delimited with "first", "second" may expressly or implicitly include at least one of those features. In the description of the present application, "a plurality of" means at least two, such as two, three, etc., unless expressly and specifically defined otherwise.

In the present application, unless expressly specified and limited otherwise, terms "installed", "communicated", "connected", "fixed" and other terms should be interpreted in a broad sense, for example, it can be a fixed connection, a detachable connection, or an integrated; it can be a mechanical connection or an electrical connection; it can be directly connected, or indirectly connected through an intermediate medium, and it can be an internal communication between two elements or an interaction relationship between the two elements, unless otherwise explicitly defined. For those of ordinary skill in the art, specific meanings of the above terms in the present application can be understood according to specific situations.

In the present application, unless expressly stated and defined otherwise, a first feature "on" or "under" a second feature may be that the first feature is in direct contact with the second feature, or the first feature and the second feature are indirectly contacted through an intermediary. In addition, the first feature being "above", "over" and "on" the second feature may mean that the first feature is directly above or obliquely above the second feature, or simply means that a horizontal height of the first feature is greater than a horizontal height of the second feature. The first feature being "below", "under" and "below" the second feature may mean that the first feature is directly below or obliquely below the second feature, or simply means that the horizontal height of the first feature is less than the horizontal height of the second feature.

It should be noted that, when an element is referred to as being "fixed to" or "arranged on" another element, it can be directly on another element, or an intervening element may also be present. When an element is referred to as being "connected" to another element, it can be directly connected to another element or intervening elements may also be present. Terms "vertical", "horizontal", "upper", "lower", "left", "right" and similar expressions used here are only for a purpose of illustration and do not represent an only embodiment.

Figure 2:
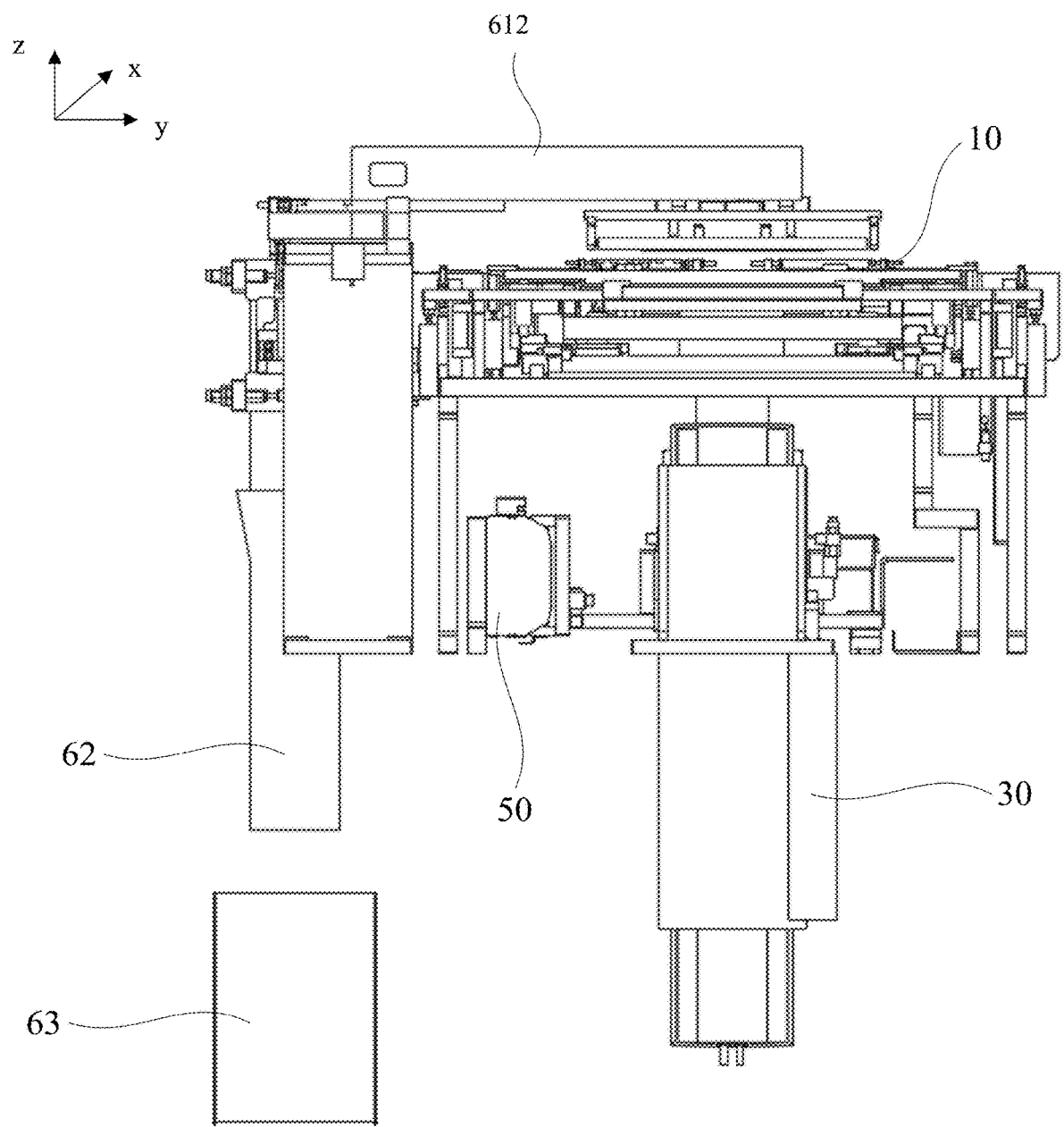
FIG. 2 is a right view of the film wrapping equipment shown in FIG. 1.
Figure 3:
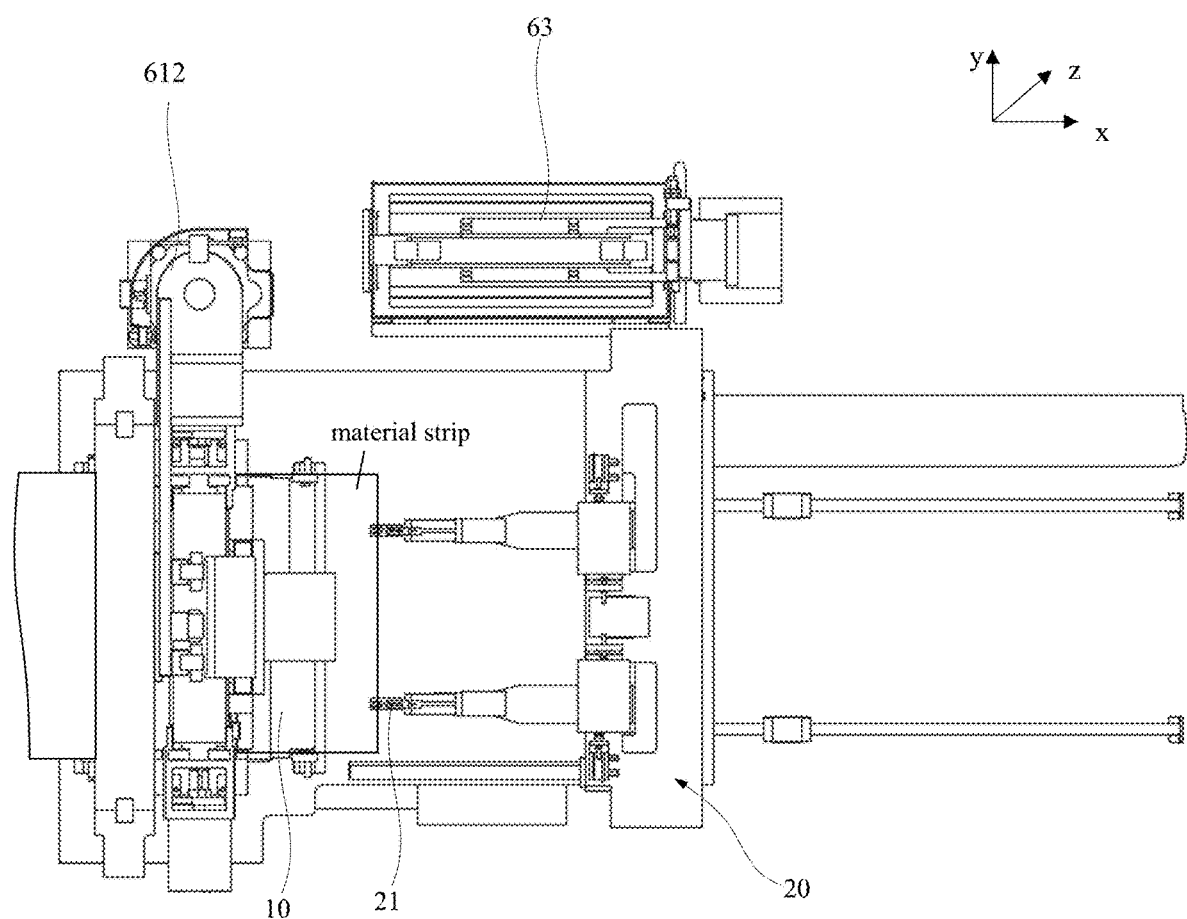
FIG. 3 is a top view of the film wrapping equipment shown in FIG. 1.
Figure 15:
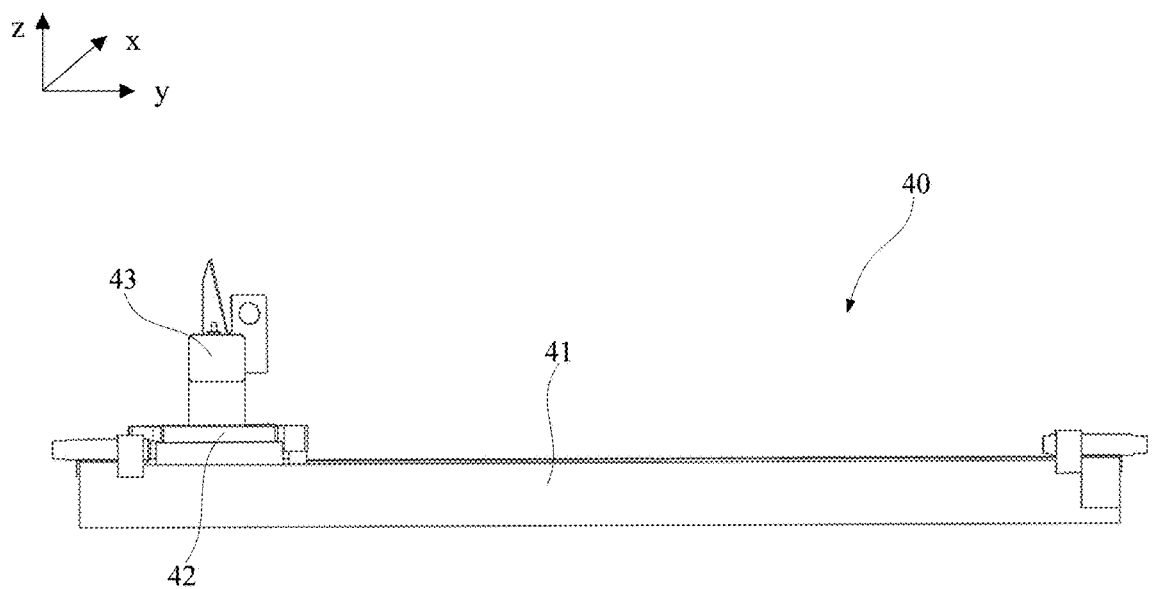
FIG. 15 is a left view of a strip cutting assembly of the film wrapping equipment shown in FIG. 1.

Please refer to FIGS. 1 to 3, a film wrapping equipment is provided in an embodiment of the present application, including a film wrapping assembly 10, a film pulling assembly 20, a product loading assembly 30, and a strip cutting assembly 40 (see FIG. 15).

Figure 4:
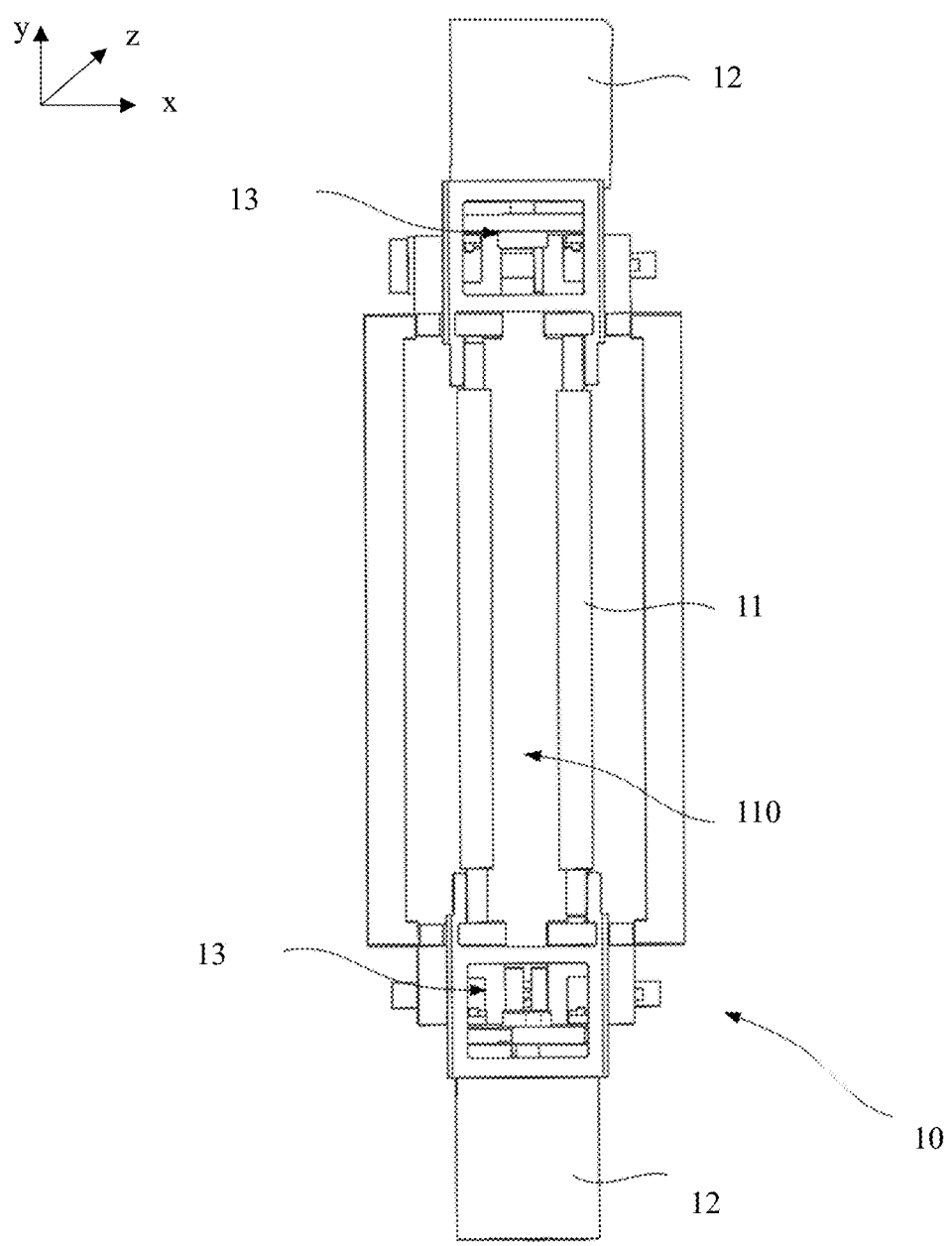
FIG. 4 is a top view of a film wrapping assembly of the film wrapping equipment shown in FIG. 1.
Figure 5:
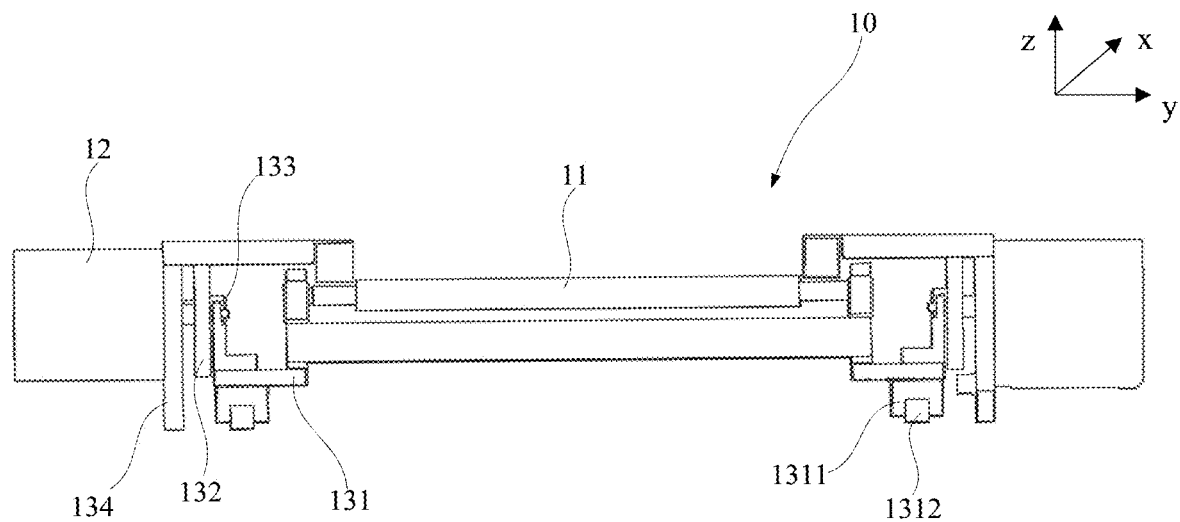
FIG. 5 is a right view of the film wrapping assembly shown in FIG. 4.

Please refer to FIG. 4 and FIG. 5, the film wrapping assembly 10 includes two film wrapping rollers 11 arranged opposite to each other in a first direction, and a film wrapping channel 110 for a product to pass through is formed between the two film wrapping rollers 11.

Please continue to refer to FIGS. 1 to 3, the film pulling assembly 20 is arranged on one side of the film wrapping assembly 10 in the first direction and is used to grab a material strip located on one side of the film wrapping assembly 10 away from the film pulling assembly 20 and pull the material strip along the first direction to move to one side of the film wrapping assembly 10 facing the film pulling assembly 20. That is to say, the film pulling assembly 20 pulls the material strip from one side of the film wrapping assembly 10 to another side of the film wrapping assembly 10 along the first direction, so that the material strip passes through the film wrapping assembly 10.

The product loading assembly 30 is used to grab the product and drive the product to pass through the above-mentioned film wrapping channel 110. Under an action of the film pulling assembly 20, the material strip passes through the film wrapping assembly 10, so that when the product loading assembly 30 drives the product to pass through the film wrapping channel 110, the material strip is wrapped on a bottom surface and two opposite surfaces of the product under a rolling action of the film wrapping rollers 11, that is, film wrapping of the product is realized. The strip cutting assembly 40 is used to cut off parts of the material strip located on two sides of the above-mentioned two film wrapping rollers 11 in the first direction, making the material strip wrapped on the product and the material strip located upstream and downstream of the film wrapping assembly 10 to be cut off. It can be understood that the product can be a battery cell and the material strip can be adhesives. Of course, the product can also be other products that need to be film wrapped, and the material strip can also be other types of membrane materials, which are not limited here.

The above-mentioned film wrapping equipment, during actual wrapping operation, firstly, the film pulling assembly 20 moves along the first direction until a starting end of the material strip located upstream of the film wrapping assembly 10 is clamped, and then returns along the first direction until the material strip is pulled over the film wrapping assembly 10 to a downstream side of the film wrapping assembly 10. At this time, the material strip covers the film wrapping channel 110 between the two film wrapping rollers 11. The product loading assembly 30 clamps the product and drives the product to be inserted from an end of the film wrapping channel 110 covered by the material strip. In a process of the product gradually passing through the film wrapping channel 110, the material strip is gradually adhered to the bottom surface and two opposite surfaces of the product under the rolling action of the two film wrapping rollers 11. When the film wrapping is about to be completed, the strip cutting assembly 40 cuts off the material strip located on the two sides of the above-mentioned two film wrapping rollers 11 in the first direction, and then the product continues to pass through the film wrapping channel 110 until it completely passes through the film wrapping channel 110, that is, the film wrapping is completed.

This way, the film wrapping equipment of the present application adopts a method of inserting the product between the two film wrapping rollers 11 (i.e., vertical film wrapping method), during a film wrapping process, the two film wrapping rollers 11 can continuously roll the material strip onto the product, and when the film wrapping of the product is about to be completed, the material strip is cut off by using the strip cutting assembly 40. During the film wrapping process, clamping is reliable without looseness, a film surface is flat without bubbles, wrinkles are prevented, and film wrapping accuracy is high.

It should be noted that, the two film wrapping rollers 11 are parallel to each other and are perpendicular to the first direction. In order to roll the material strip onto a surface of the product, both the two film wrapping rollers 11 can rotate around their own axes. That is to say, the two film wrapping rollers 11 clamp the product tightly, and the two film wrapping rollers 11 are driven to rotate during a process of the product gradually passing through the two film wrapping rollers 11.

It should also be noted that during an insertion process of the product into the film wrapping channel 110, the product will drive the material strip on the two sides of the product to gradually enter the film wrapping channel 110 and be adhered onto the product. Therefore, the material strip located upstream will gradually be rolled towards the film wrapping channel 110, and the film pulling assembly 20 will gradually move to the film wrapping rollers 11 along the first direction, so that the material strip located downstream of the product will also gradually move to the film wrapping channel 110.

Figure 7:
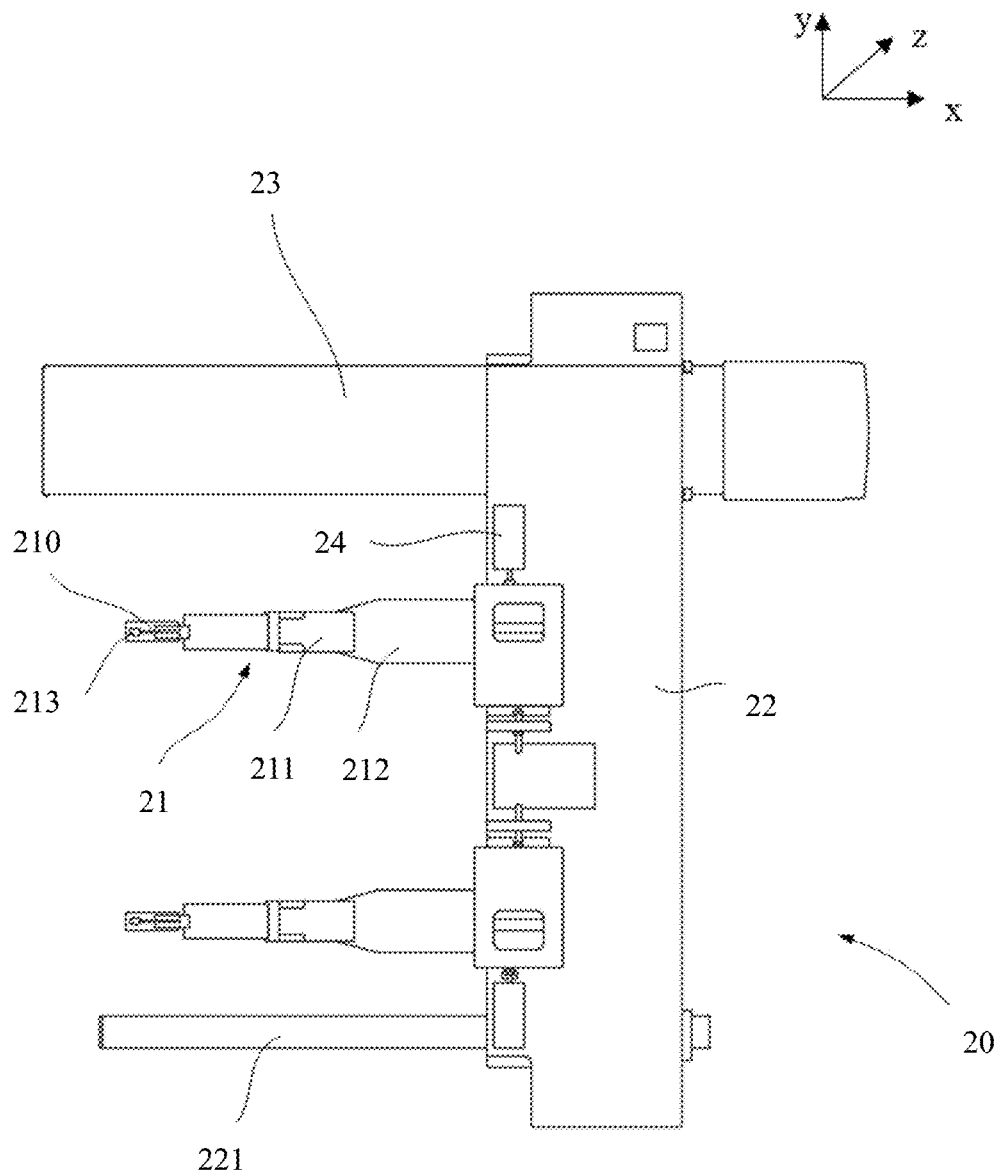
FIG. 7 is a top view of a film pulling assembly of the film wrapping equipment shown in FIG. 1.
Figure 8:
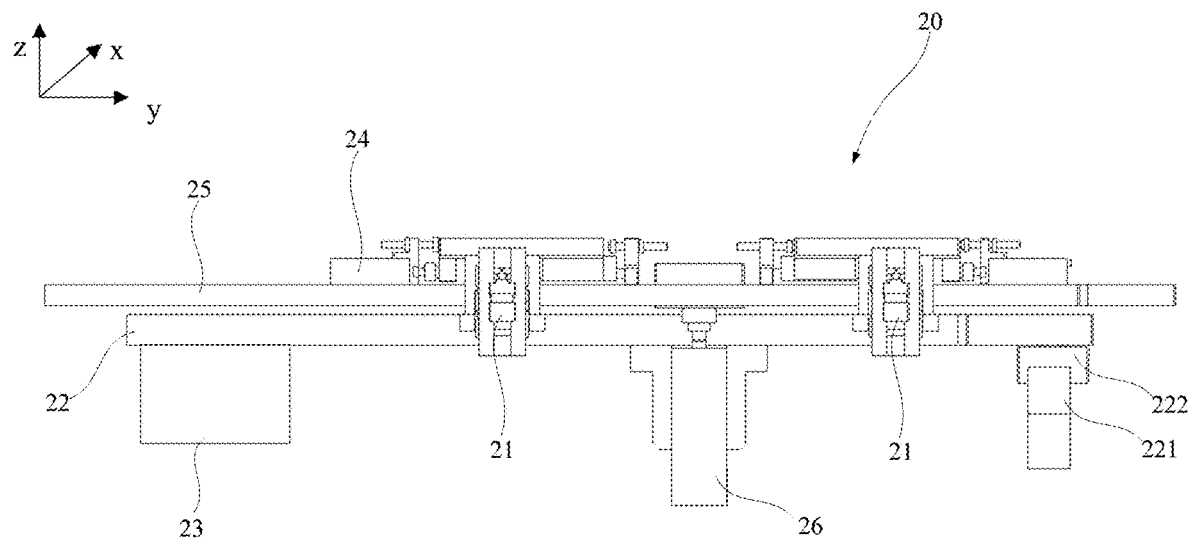
FIG. 8 is a left view of the film pulling assembly shown in FIG. 7.
Figure 9:
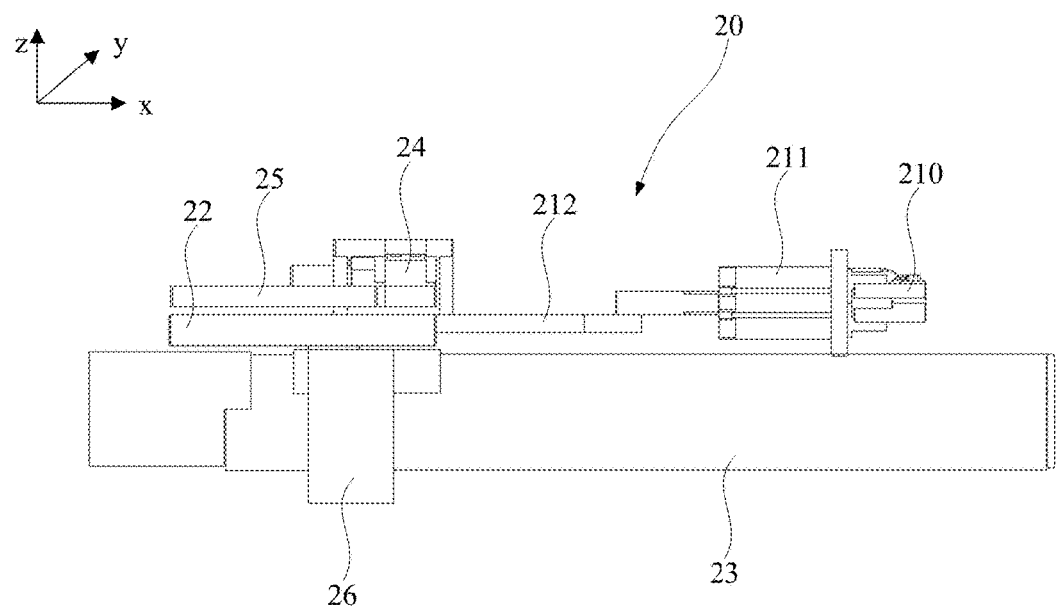
FIG. 9 is a front view of the film pulling assembly shown in FIG. 7.

Please refer to FIGS. 7 to 9, in the embodiment of the present application, the film pulling assembly 20 includes a strip pulling moving seat 22 and two strip clamping mechanisms 21 both used to clamp the material strip. The strip pulling moving seat 22 is controllably movable along the first direction. The two strip clamping mechanisms 21 are arranged on the strip pulling moving seat 22 at intervals along a second direction perpendicular to the first direction, and the two strip clamping mechanisms 21 can be close to each other or move away from each other along the second direction. This way, the two strip clamping mechanisms 21 are used to clamp the material strip together, and the two strip clamping mechanisms 21 can be driven away from each other to tighten the material strip in its wide direction (i.e., the second direction), further preventing wrinkles and other irregularities when the material strip is adhered onto the product. It should also be noted that, of course, a distance between the two strip clamping mechanisms 21 can also be adjusted by driving the two strip clamping mechanisms 21 to be close to each other or move away from each other, so that it can adapt to clamping of the material strip with different width and size, which is conducive to improving compatibility of the equipment.

In some embodiments, the film pulling assembly 20 further includes a strip pulling lifting seat 25 arranged on the strip pulling moving seat 22. The strip pulling lifting seat 25 is movable along a third direction relative to the strip pulling moving seat 22. The two strip clamping mechanisms 21 are arranged on the strip pulling lifting seat 25, so as to make the two strip clamping mechanisms 21 move along the third direction together with the strip pulling lifting seat 25. Wherein, the third direction is perpendicular to the first direction and the second direction. This way, when performing a strip pulling action, firstly, the strip pulling lifting seat 25 is driven to ascend along the third direction, so as to prevent interference with the film wrapping assembly 10 during a moving process of the two strip clamping mechanisms 21 along the first direction. When the two strip clamping mechanisms 21 pull the material strip to a preset position, the strip pulling lifting seat 25 is driven to descend along the third direction, so as to drive the material strip to cover the two film wrapping rollers 11.

It should be noted that, in the embodiment shown in FIG. 1, the first direction is a left and right direction, the second direction is a direction perpendicular to the page, and the third direction is a vertical direction.

Specifically, in the embodiment, the film pulling assembly 20 further includes a strip pulling driving member 23 and a lifting driving member 26. The strip pulling driving member 23 is drivingly connected to the strip pulling moving seat 22, so as to drive the strip pulling moving seat 22 to move along the first direction. The lifting driving member 26 is mounted on the strip pulling moving seat 22 and is drivingly connected to the strip pulling lifting seat 25, so as to drive the strip pulling lifting seat 25 to move along the third direction relative to the strip pulling moving seat 22. This way, the strip pulling driving member 23 and the lifting driving member 26 are used to drive the two strip clamping mechanisms 21 respectively to move together along the first direction and the third direction. Alternatively, a cylinder can be used for the strip pulling driving member 23, and the cylinder can also be used for the lifting driving member 26.

Furthermore, the film pulling assembly 20 further includes a first sliding block 222 and a first sliding rail 221. The first sliding block 222 is fixedly connected to the strip pulling moving seat 22; and the first sliding rail 221 extends longitudinally along the first direction, and the first sliding block 222 is slidably connected to the first sliding rail 221. This way, sliding cooperation of the first sliding block 222 and the first sliding rail 221 is used to guide movement of the strip pulling moving seat 22 along the first direction.

It should be noted that, a guiding structure, such as a sliding block and a sliding rail structure or a guiding rod and a guiding sleeve structure, can also be set between the strip pulling moving seat 22 and the strip pulling lifting seat 25. This guiding structure is used to guide movement of the strip pulling lifting seat 25 along the third direction relative to the strip pulling moving seat 22, which is not limited here.

Specifically, in the embodiment, each strip clamping mechanism 21 includes a strip clamping mounting plate 212, a gripper cylinder 211, and a gripper 210. The strip clamping mounting plate 212 is movably connected to the strip pulling lifting seat 25 along the second direction. The gripper cylinder 211 is mounted on the strip clamping mounting plate 212 and is drivingly connected to the gripper 210. The gripper cylinder 211 can drive the gripper 210 to clamp or release the material strip.

Furthermore, the film pulling assembly 20 further includes two tightening driving members 24 corresponding to the two strip clamping mounting plates 212 one-to-one.

Both the two tightening driving members 24 are mounted on the strip pulling lifting seat 25 and are drivingly connected to corresponding strip clamping mounting plates 212, respectively, so as to drive the two strip clamping mounting plates 212 respectively to be close to each other or move away from each other, so as to drive the two grippers 210 to be close to each other or move away from each other, so that a distance between the two grippers 210 in the second direction can be adjusted. Alternatively, the tightening driving members 24 may adopt cylinders.

It should be noted that, movement of the strip clamping mounting plates 212 along the second direction can also be guided by sliding cooperation of a sliding block and a sliding rail, which is not limited here.

Furthermore, each gripper 210 is equipped with a detecting sensor 213 for detecting a position of the material strip, so as to clamp the material strip accurately.

Figure 6:
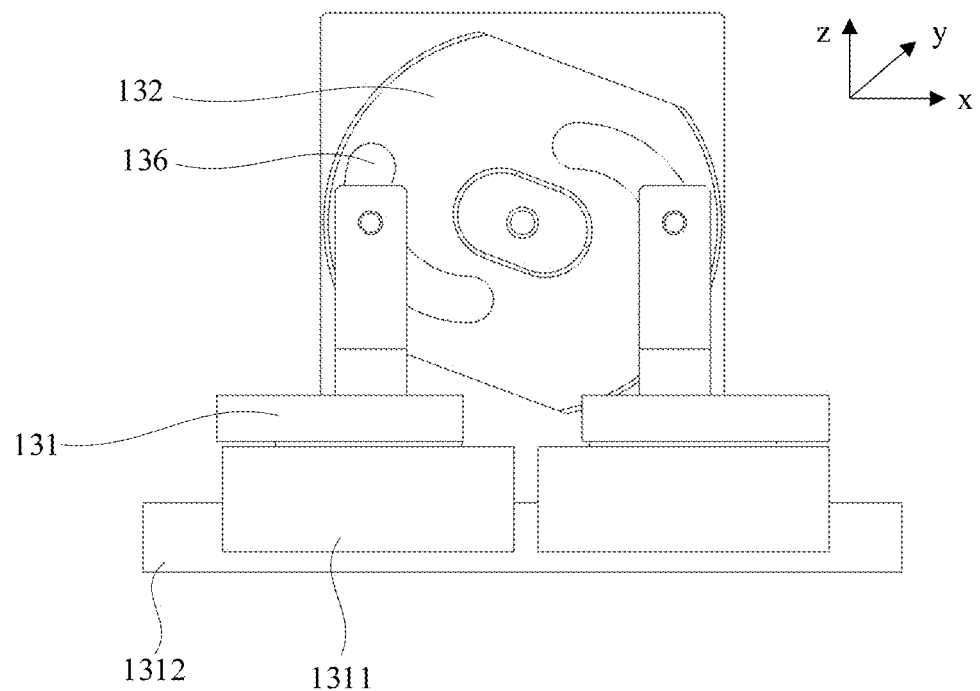
FIG. 6 is a front view of a film wrapping transmission mechanism of the film wrapping assembly shown in FIG. 5.

Please refer to FIG. 4, FIG. 5, and FIG. 6, in the embodiment of the present application, the two film wrapping rollers 11 are configured close to each other or moving away from each other along the first direction. This way, a distance between the two film wrapping rollers 11 can be adjusted by the two film wrapping rollers 11 close to each other or moving away from each other along the first direction to use different types of products and improve compatibility of the equipment.

Specifically, in the embodiment, the film wrapping assembly 10 further includes a film wrapping driving member 12, and a film wrapping transmission mechanism 13 connected to the film wrapping driving member 12 by transmission. The film wrapping transmission mechanism 13 is connected to the two film wrapping rollers 11 by transmission, so that the two film wrapping rollers 11 are driven by the film wrapping driving member 12 to be close to each other or move away from each other along the first direction, so that the distance between the two film wrapping rollers 11 can be adjusted.

Specifically, in the embodiment, the film wrapping transmission mechanism 13 includes a film wrapping fixed seat 134, a cam slot plate 132, two cam followers 133, and two film wrapping mounting seats 131. The film wrapping driving member 12 is mounted on the film wrapping fixed seat 134. The cam slot plate 132 is mounted on an output shaft of the film wrapping driving member 12, so as to be driven by the film wrapping driving member 12 to rotate. The two film wrapping mounting seats 131 are arranged close to each other or moving away from each other along the first direction, and the two film wrapping rollers 11 are rotatably connected to the two film wrapping mounting seats 131 around their own axes, respectively, so that the two film wrapping rollers 11 are driven to be close to each other or move away from each other along the first direction when the two film wrapping mounting seats 131 are close to each other or move away from each other along the first direction. The two cam followers 133 are mounted on the two film wrapping mounting seats 131, respectively, and are cooperated with a cam slot 136 by transmission, so as to drive the two film wrapping mounting seats 131 to be close to each other or move away from each other along the first direction during a rotating process of the cam slot plate 132, so that the two film wrapping rollers 11 are driven to be close to each other or move away from each other. Alternatively, the film wrapping driving member 12 may adopt a motor.

Furthermore, each film wrapping mounting seat 131 is equipped with a second sliding block 1311. The second sliding block 1311 is slidably connected to a second sliding rail 1312, and the second sliding rail 1312 extends longitudinally along the first direction. This way, sliding cooperation of the second sliding block 1311 and the second sliding rail 1312 is used to guide movement of the film wrapping mounting seat 131 along the first direction.

It should be noted that, there are two sets of the film wrapping driving members 12 and the film wrapping transmission mechanisms 13, and the two sets of the film wrapping driving members 12 and the film wrapping transmission mechanisms 13 are arranged on two ends of the film wrapping rollers 11, respectively (that is, two ends of the film wrapping rollers 11 along the second direction), so as to jointly drive the two film wrapping rollers 11 to be close to each other or move away from each other.

Figure 10:
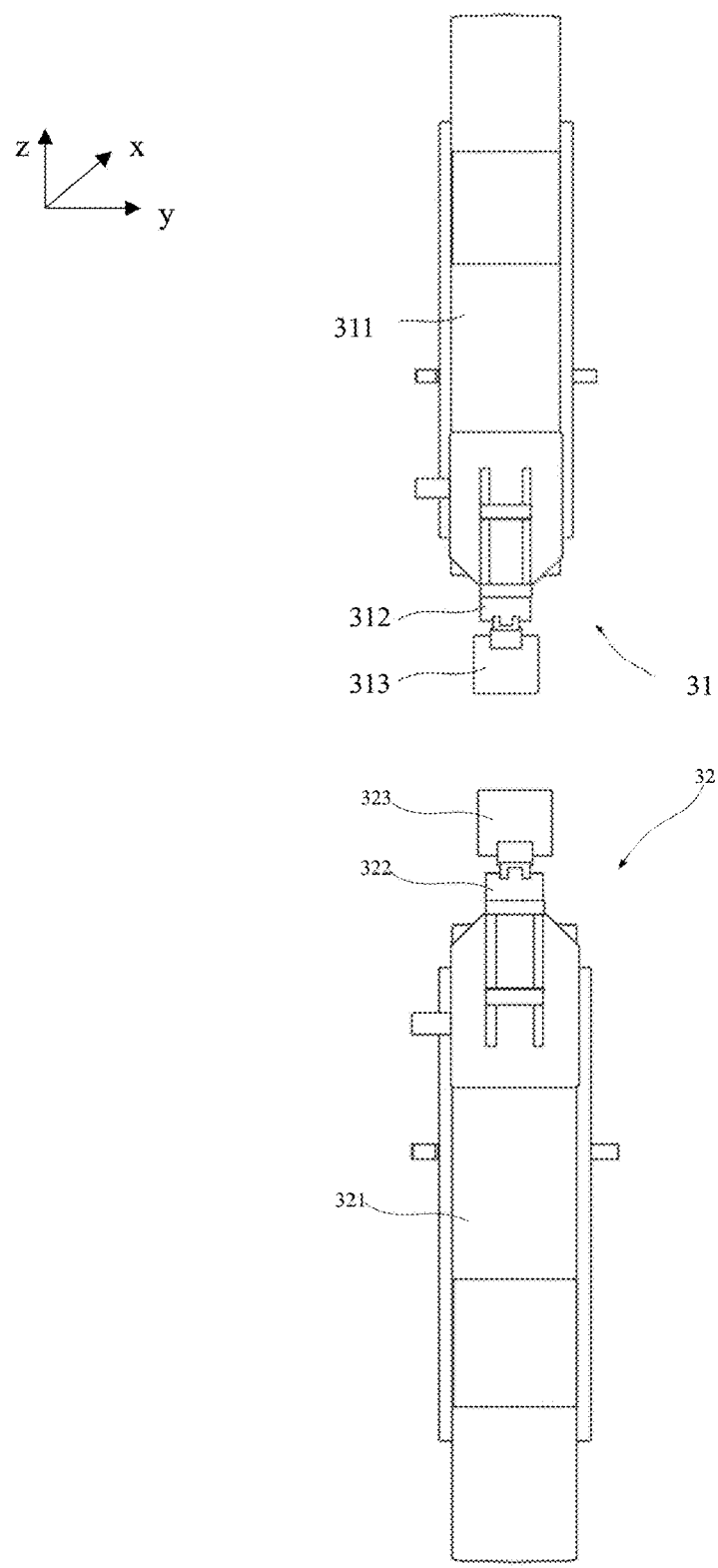
FIG. 10 is a left view of a first product clamping mechanism and a second product clamping mechanism of a product loading assembly shown in FIG. 1.
Figure 11:
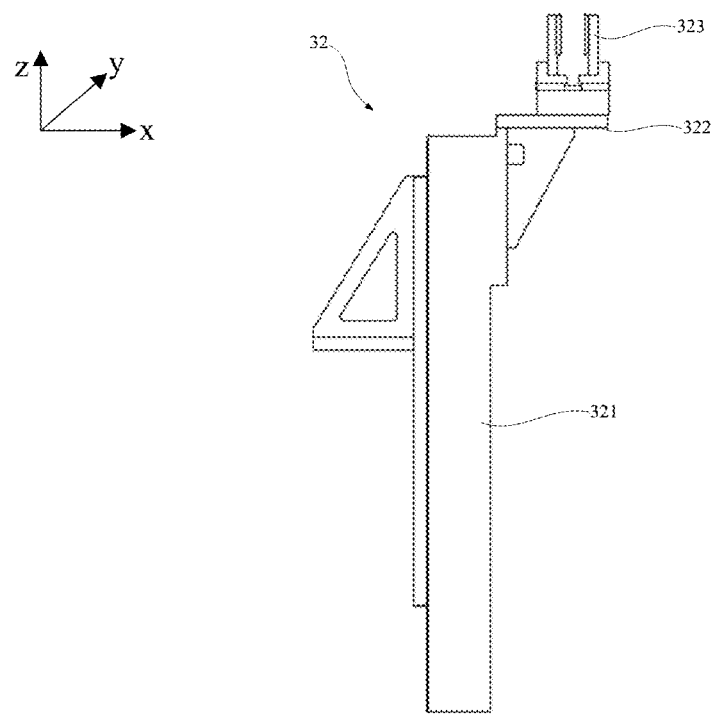
FIG. 11 is a front view of the second product clamping mechanism shown in FIG. 10.

Please refer to FIG. 1, FIG. 10, and FIG. 11, in the embodiment of the present application, the product loading assembly 30 includes a first product clamping mechanism and a second product clamping mechanism 32 arranged opposite to each other in the third direction, and the film wrapping assembly 10 is located between the first product clamping mechanism and the second product clamping mechanism 32. The first product clamping mechanism is used to clamp the product and to insert the product into the film wrapping channel 110 along the third direction. The second product clamping mechanism 32 is used to clamp product passing through the film wrapping channel 110 and pull the product out along the third direction to an unloading position.

This way, when performing film wrapping, the first product clamping mechanism 31 clamps one end of a product to be film wrapped, another end of the product is inserted into the film wrapping channel 110 between the two film wrapping rollers 11 along the third direction. The second product clamping mechanism 32 clamps an end of the product passing through the film wrapping channel 110. At this time, two ends of the product in the third direction are clamped by the first product clamping mechanism 31 and the second product clamping mechanism 32, respectively. Then, the first product clamping mechanism 31 and the second product clamping mechanism 32 jointly drive the product to continue to pass through the film wrapping channel 110. Until the first product clamping mechanism 31 contacts or is about to contact the film wrapping rollers 11, the product is discontinued to be inserted. The first product clamping mechanism 31 releases the product and resets, and the strip cutting assembly 40 cuts off the material strip. Then, the second product clamping mechanism 32 continues to drive the product to pass through the film wrapping channel 110, so as to continue to roll and adhere a tail end of the material strip onto the product, that is, the film wrapping is completed.

Specifically, in the embodiment, the first product clamping mechanism 31 includes a first lifting driving member 311, a first lifting seat 312, and a first clamping structure 313. The first lifting driving member 311 is drivingly connected to the first lifting seat 312, so as to drive the first lifting seat 312 to move along the third direction. The first clamping structure 313 used to clamp the product is mounted on the first lifting seat 312, so that the first clamping structure 313 can move along the third direction together with the first lifting seat 312. This way, when the product needs to be clamped, the first lifting driving member 311 drives the first lifting seat 312 to move along the third direction, until the first clamping structure 313 is driven to move to a loading position, so that the first clamping structure 313 clamps a product to be film wrapped on the loading position. Then, the first lifting driving member 311 drives the first lifting seat 312 to move to the film wrapping channel 110 along the third direction (at this time, the material strip passes through the first clamping structure 313 and the above-mentioned film wrapping rollers 11), so that the product is inserted into the film wrapping channel 110 to complete the film wrapping. Alternatively, the first lifting driving member 311 may be a transformer. In some embodiments, the first product clamping mechanism 31 may be mounted on other parts (not shown in figure) of the film wrapping equipment.

Furthermore, the first clamping structure includes a first air claw and two first clamping plates. The first air claw is mounted on the first lifting driving member, and the two first clamping plates are mounted on the first air claw, so that the first air claw can drive the two first clamping plates to clamp or release the product.

Please refer to FIG. 10 and FIG. 11, specifically, in the embodiment, the second product clamping mechanism 32 includes a second lifting driving member 321, a second lifting seat 322, and a second clamping structure 323. The second lifting driving member 321 is drivingly connected to the second lifting seat 322, so as to drive the second lifting seat 322 to move along the third direction. The second clamping structure 323 used to clamp the product is mounted on the second lifting seat 322, so that the second clamping structure 323 can move along the third direction together with the second lifting seat 322. This way, when the product needs to be clamped, the second clamping structure 323 clamps an end of the product (the end of the product is adhered with the material strip) passing through the film wrapping channel 110. Then, the second lifting driving member 321 drives the second lifting seat 322 to move away from the film wrapping channel 110 along the third direction, so as to drive the product to continue to pass through the film wrapping channel 110 to complete the film wrapping. Alternatively, the second lifting driving member 321 may be the transformer.

Furthermore, the second clamping structure 323 includes a second air claw and two second clamping plates. The second air claw is mounted on the second lifting driving member 321, and the two second clamping plates are mounted on the second air claw, so that the second air claw can drive the two second clamping plates to clamp or release the product. Alternatively, an elastic layer is arranged on sides of the two second clamping plates facing each other to prevent damage to the product, which is conducive to adapting to film wrapping of a soft encapsulation battery cell.

Figure 16:
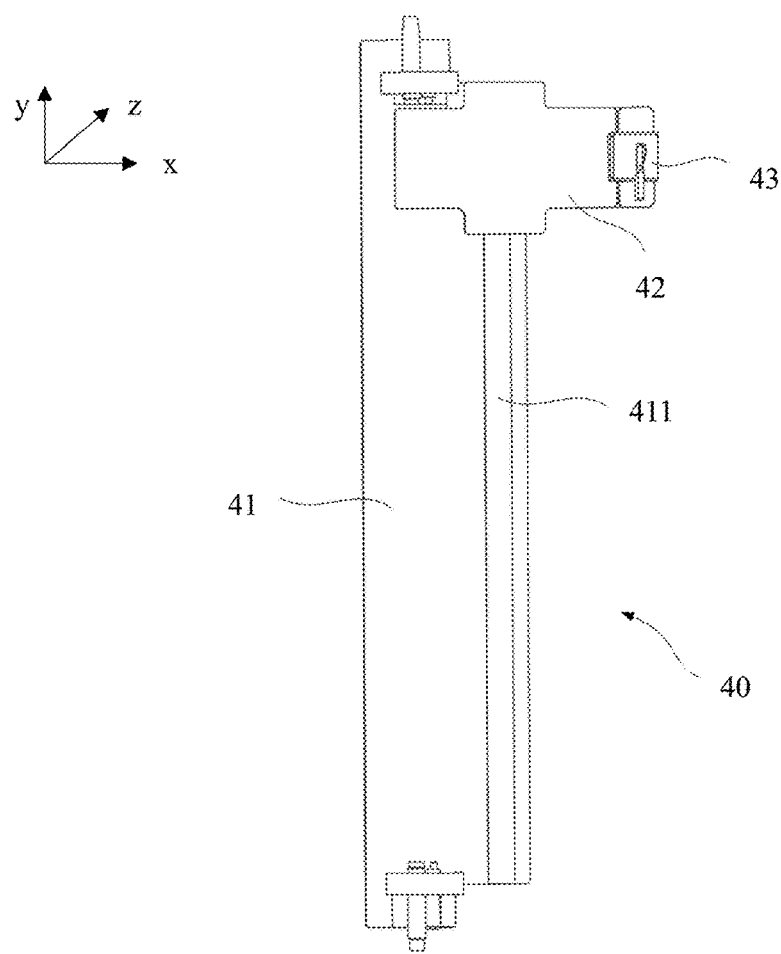
FIG. 16 is a top view of the strip cutting assembly shown in FIG. 15.
Figure 17:
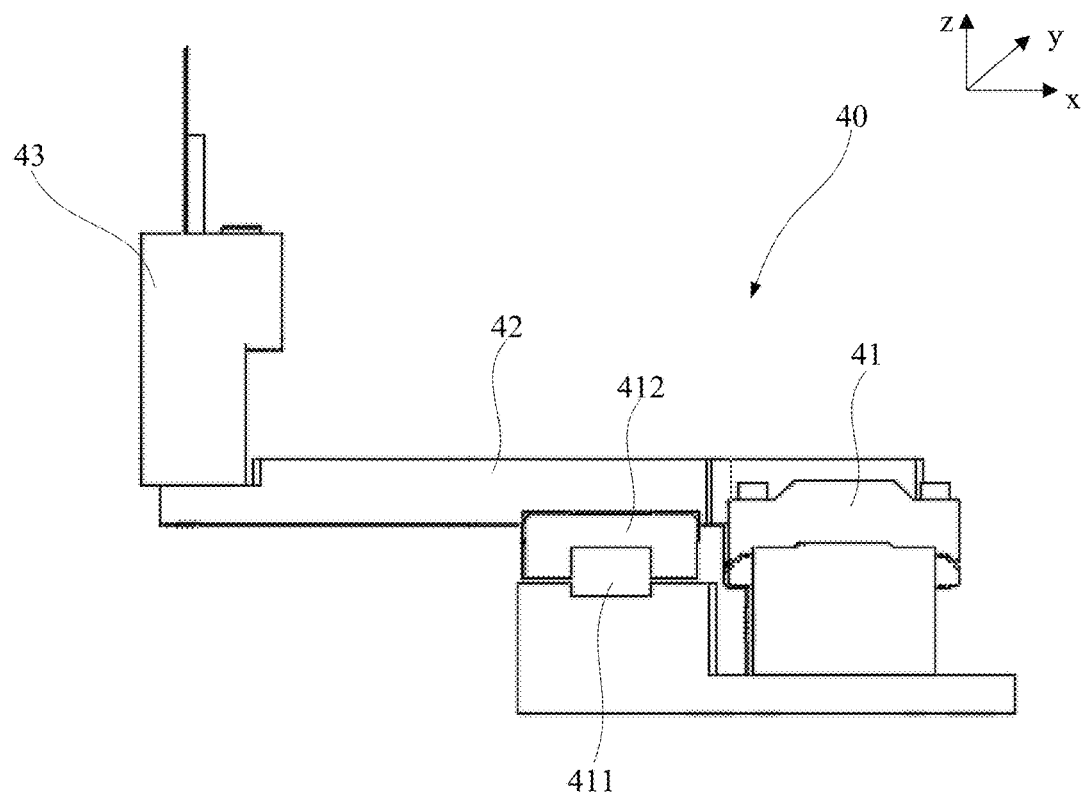
FIG. 17 is a front view of the strip cutting assembly shown in FIG. 15.

Please refer to FIGS. 15 to 17, in the embodiment of the present application, the strip cutting assembly 40 includes a strip cutting moving seat 42, a strip cutting driving member 41, and a cutter mechanism 43. The strip cutting moving seat 42 is movably arranged along the second direction perpendicular to the first direction. The strip cutting driving member 41 is drivingly connected to the strip cutting moving seat 42, so as to drive the strip cutting moving seat 42 to move along the second direction. The cutter mechanism 43 is mounted on the strip cutting moving seat 42 so as to cut off the material strip as the cutter mechanism moves with the strip cutting moving seat along the second direction. Alternatively, the strip cutting driving member 41 may adopt the cylinder.

Specifically, in the embodiment, the strip cutting moving seat 42 is equipped with a third sliding block 412, and the third sliding block 412 is slidably cooperated with a third sliding rail 411, and the third sliding rail 411 extends longitudinally along the second direction. This way, sliding cooperation of the third sliding block 412 and the third sliding rail 411 is used to guide movement of the strip cutting moving seat 42 along the second direction.

Figure 18:
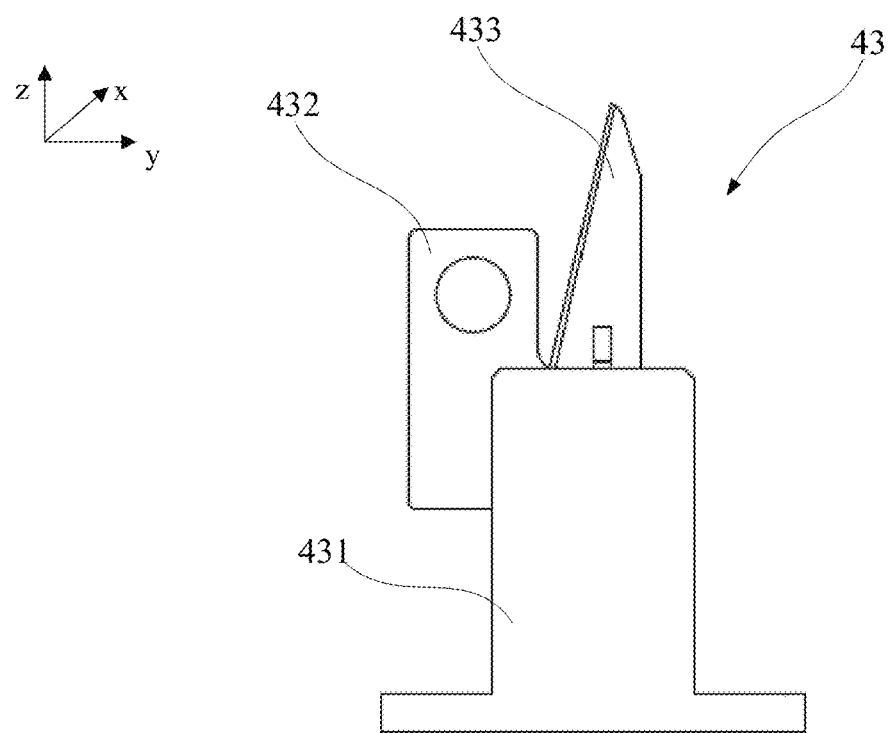
FIG. 18 is a left view of a cutter mechanism of the strip cutting assembly shown in FIG. 15.
Figure 19:
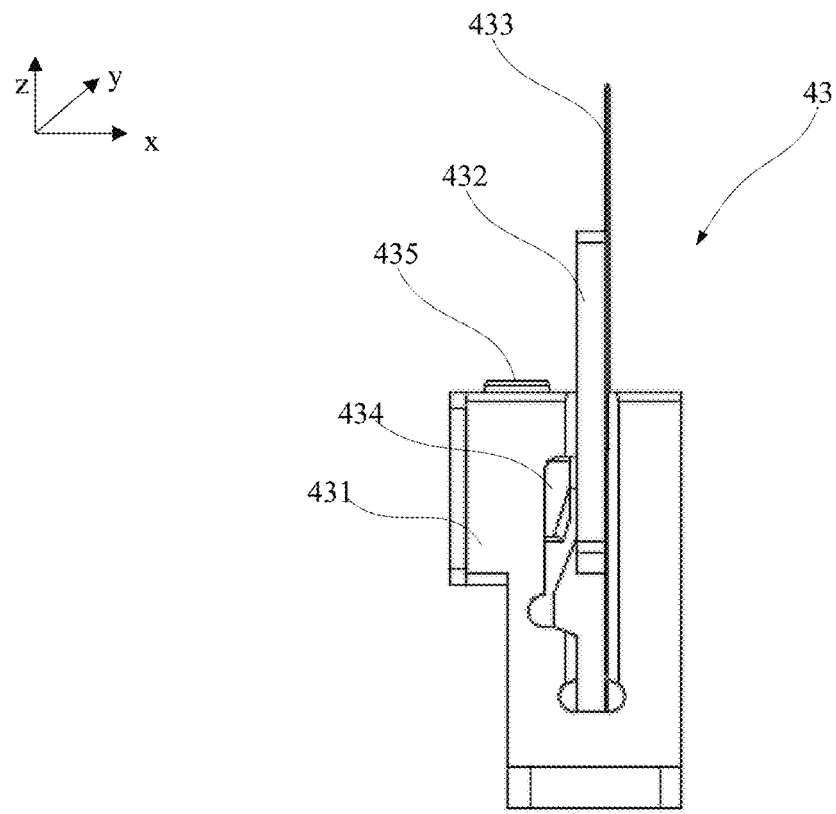
FIG. 19 is a front view of the cutter mechanism shown in FIG. 18.
Figure 20:
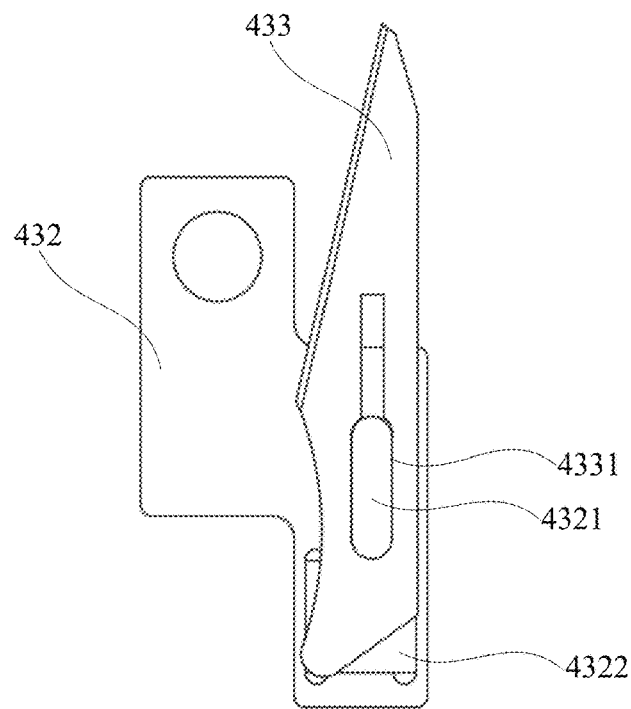
FIG. 20 is a schematic structural diagram of a cutter and a cutter quick removal seat of the cutter mechanism shown in FIG. 18.

Please refer to FIGS. 18 to 20, in some embodiments, the cutter mechanism 43 includes a cutter fixed seat 431, a cutter quick removal seat 432, and a cutter 433. The cutter fixed seat 431 is mounted on the strip cutting moving seat 42, the cutter quick removal seat 432 is detachably connected to the cutter fixed seat 431, and the cutter 433 is detachably connected to the cutter quick removal seat 432. This way, when the cutter 433 needs to be replaced, the cutter quick removal seat 432 is removed from the cutter fixed seat 431, then the cutter 433 is removed from the cutter quick removal seat 432 and replaced with a new cutter 433, finally, the cutter quick removal seat 432 is remounted on the cutter fixed seat 431. Replacement of the cutter 433 is convenient and fast.

Specifically, in the embodiment, the cutter quick removal seat 432 has a positioning protrusion 4321 and a magnetic suction portion 4322. The cutter 433 has a positioning slot 4331 corresponding to the positioning protrusion 4321. This way, the cutter 433 is attached to the cutter quick removal seat 432, so that the positioning protrusion 4321 penetrates the positioning slot 4331, and the magnetic suction portion 4322 is attached to and fixed to the cutter 433. Furthermore, the magnetic suction portion 4322 can be a magnet embedded on the cutter quick removal seat 432.

Specifically, in the embodiment, the cutter mechanism 43 further includes a pressing screw 435 and a wedge block 434. The cutter fixed seat 431 has an insertion groove. The cutter quick removal seat 432 inserts into the insertion groove, the wedge block 434 is used to tighten the cutter quick removal seat 432 in the insertion groove. The pressing screw 435 is threaded to the cutter fixed seat 431, and one end of the pressing screw 435 abuts the wedge block 434 to limit the wedge block 434. This way, when the cutter quick removal seat 432 needs to be removed, the pressing screw 435 is firstly screwed out, and the wedge block 434 is taken out to relieve tightening of the cutter quick removal seat 432. At this time, the cutter quick removal seat 432 can be easily pulled out from the insertion groove.

It should be noted that, because the material strip located on the two sides of the film wrapping assembly 10 in the first direction need to be cut off, the film wrapping equipment can include two of the strip cutting assemblies 40 arranged on the two sides of the film wrapping assembly 10 in the first direction, respectively. The two of the strip cutting assemblies 40 can be used to cut off the material strip at a same time.

Figure 12:
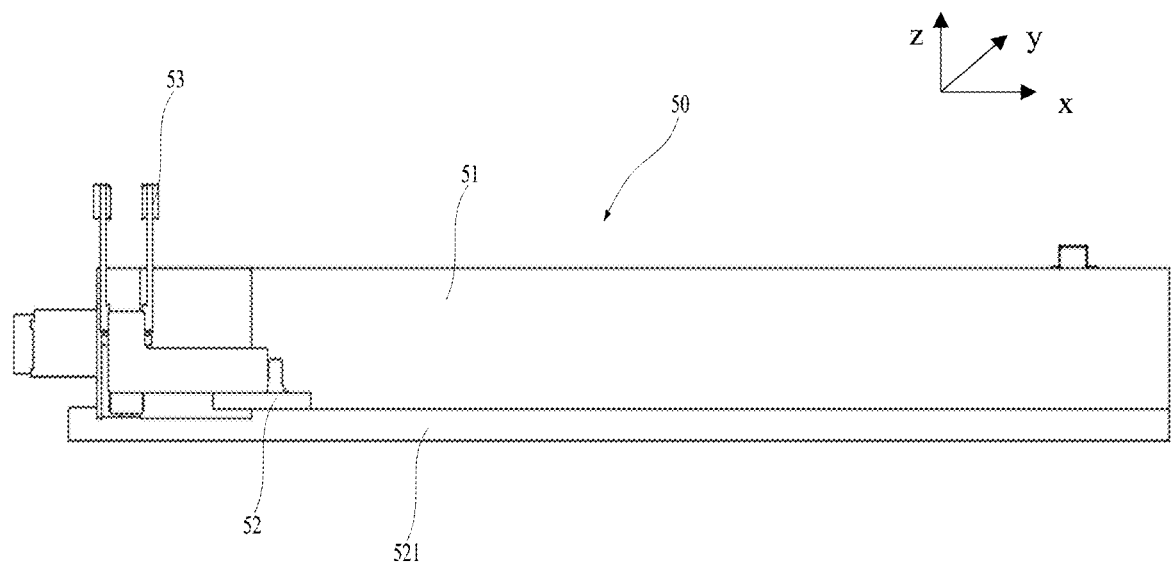
FIG. 12 is a front view of a product removal assembly of the film wrapping equipment shown in FIG. 1.
Figure 13:
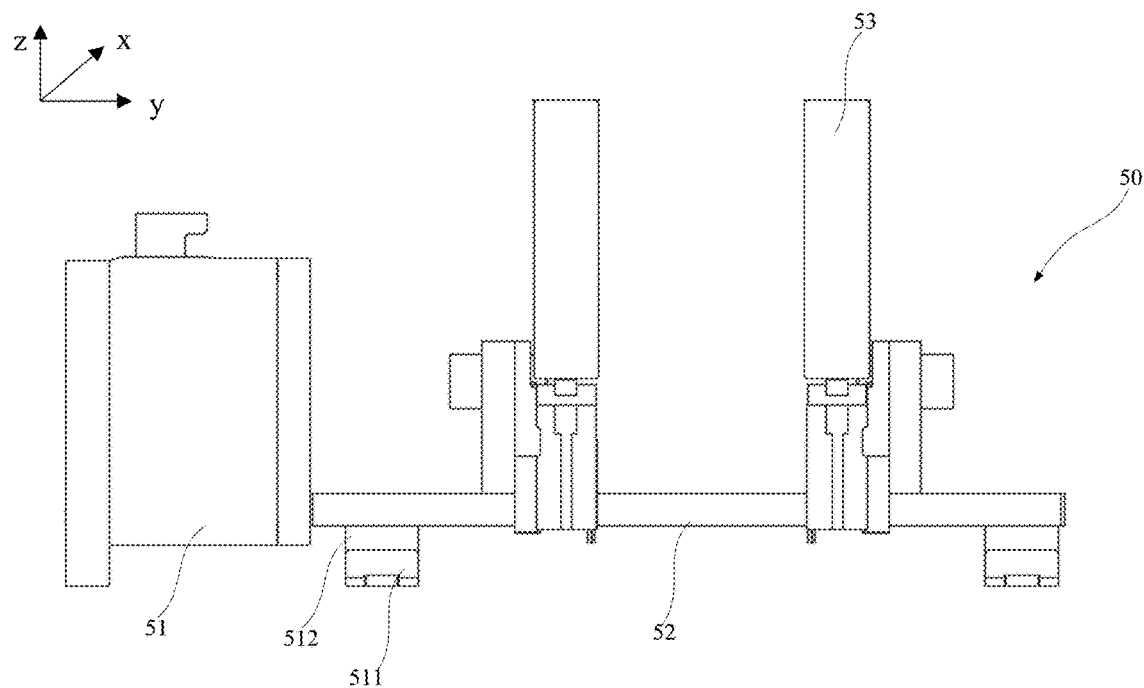
FIG. 13 is a left view of the product removal assembly shown in FIG. 12.
Figure 14:
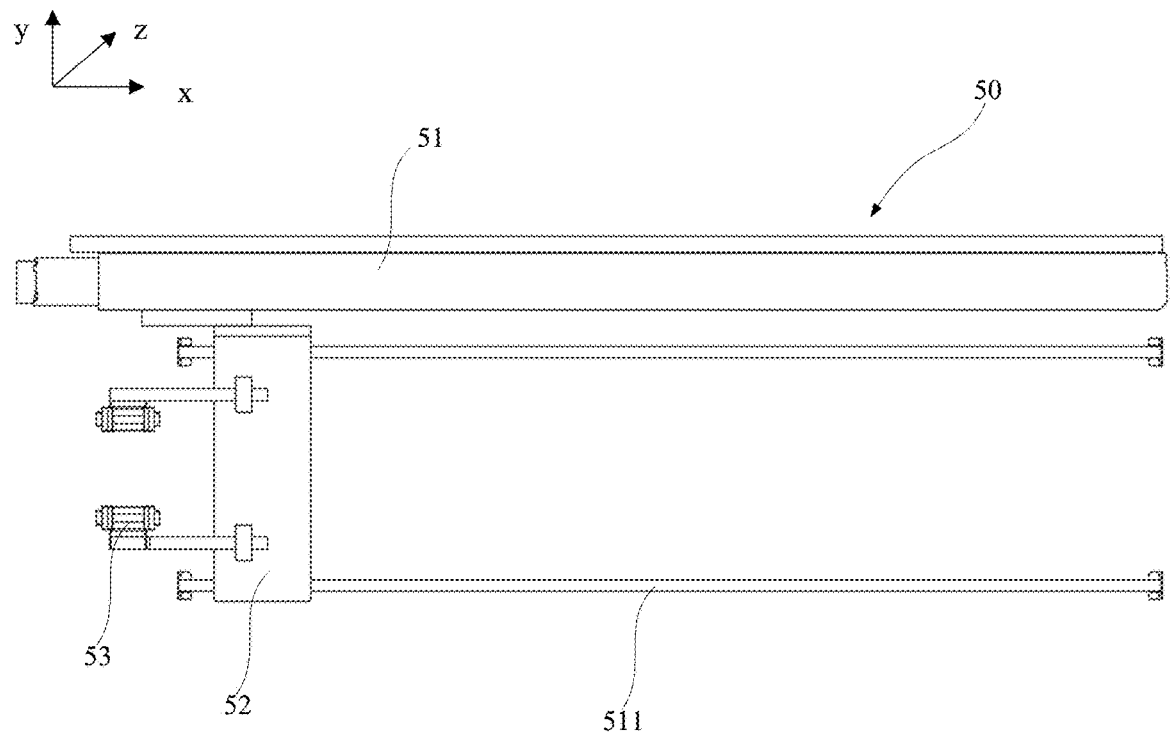
FIG. 14 is a top view of the product removal assembly shown in FIG. 12.

Please refer to FIGS. 12 to 14, in the embodiment of the present application, the film wrapping equipment further includes a product removal assembly 50. The product removal assembly 50 includes a clamping sub-structure 53 and a removal driving structure. The clamping sub-structure 53 is a third clamping structure 53. The removal driving structure is drivingly connected to the third clamping structure 53, so as to drive the third clamping structure 53 to move between the unloading position and a removal position. The third clamping structure 53 is used to clamp a product film wrapped at the unloading position. This way, when the product completes the film wrapping and moves to the unloading position with the second product clamping mechanism 32, the third clamping structure 53 clamps the product, and then the removal driving structure drives the third clamping structure 53 to move (i.e., move along the first direction) to the removal position. Alternatively, the third clamping structure 53 may adopt a clamping mechanism such as an air claw, which is not limited here.

Specifically, in the embodiment, the removal driving structure includes a removal movable plate 52 and a removal driving member 51. The removal movable plate 52 is movably arranged (i.e., movably arranged along the first direction), and the removal driving member 51 is drivingly connected to the removal movable plate 52, so as to drive the removal movable plate 52 to move. The third clamping structure 53 is mounted on the removal movable plate 52, so that the third clamping structure 53 can move between the unloading position and the removal position with the removal movable plate 52. Alternatively, the removal driving member 51 can adopt the transformer.

Furthermore, the removal movable plate 52 is equipped with a fourth sliding block 512, and the fourth sliding block 512 is slidably connected to a fourth sliding rail 511. This way, sliding cooperation of the fourth sliding block 512 and the fourth sliding rail 511 is used to guide movement of the removal movable plate 52.

Specifically, in the embodiment, there are two of the third clamping structures 53. When the two of the third clamping structures 53 move to the unloading position with the removal movable plate 52, and when the second clamping structure 323 also moves to the unloading position, the second clamping structure 323 is located between the two third clamping structures 53, and the second clamping structure 323 and the third clamping structure 53 clamp the product along a same direction together. This way, on one hand, the two third clamping structures 53 are used to clamp the product together, making clamping of the product more stable and reliable; on another hand, interference between the second clamping structure 323 and the third clamping structures 53 is prevented.

Figure 21:
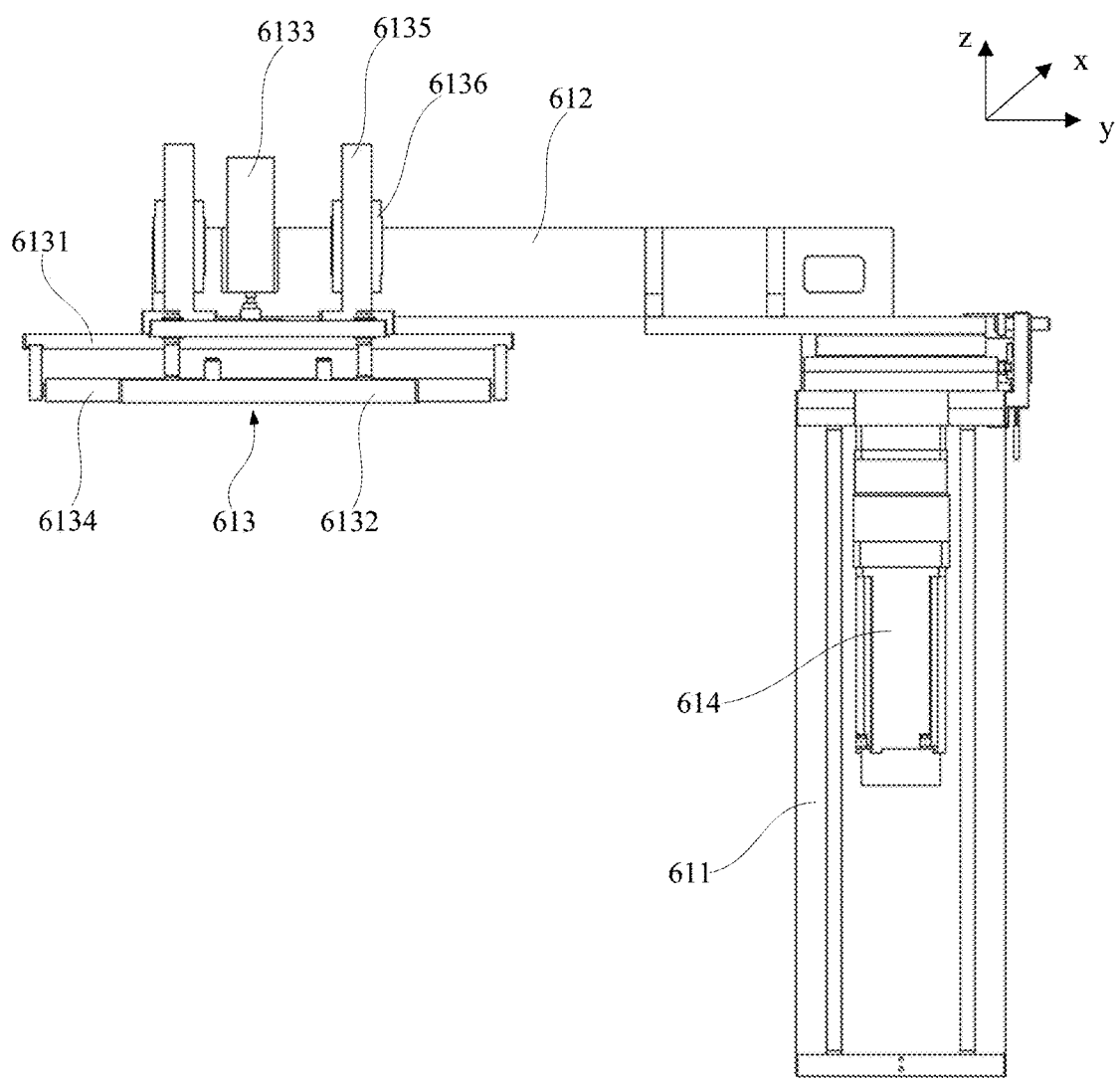
FIG. 21 is a right view of a waste material suction mechanism of a waste material disposal assembly of the film wrapping equipment shown in FIG. 1.
Figure 22:
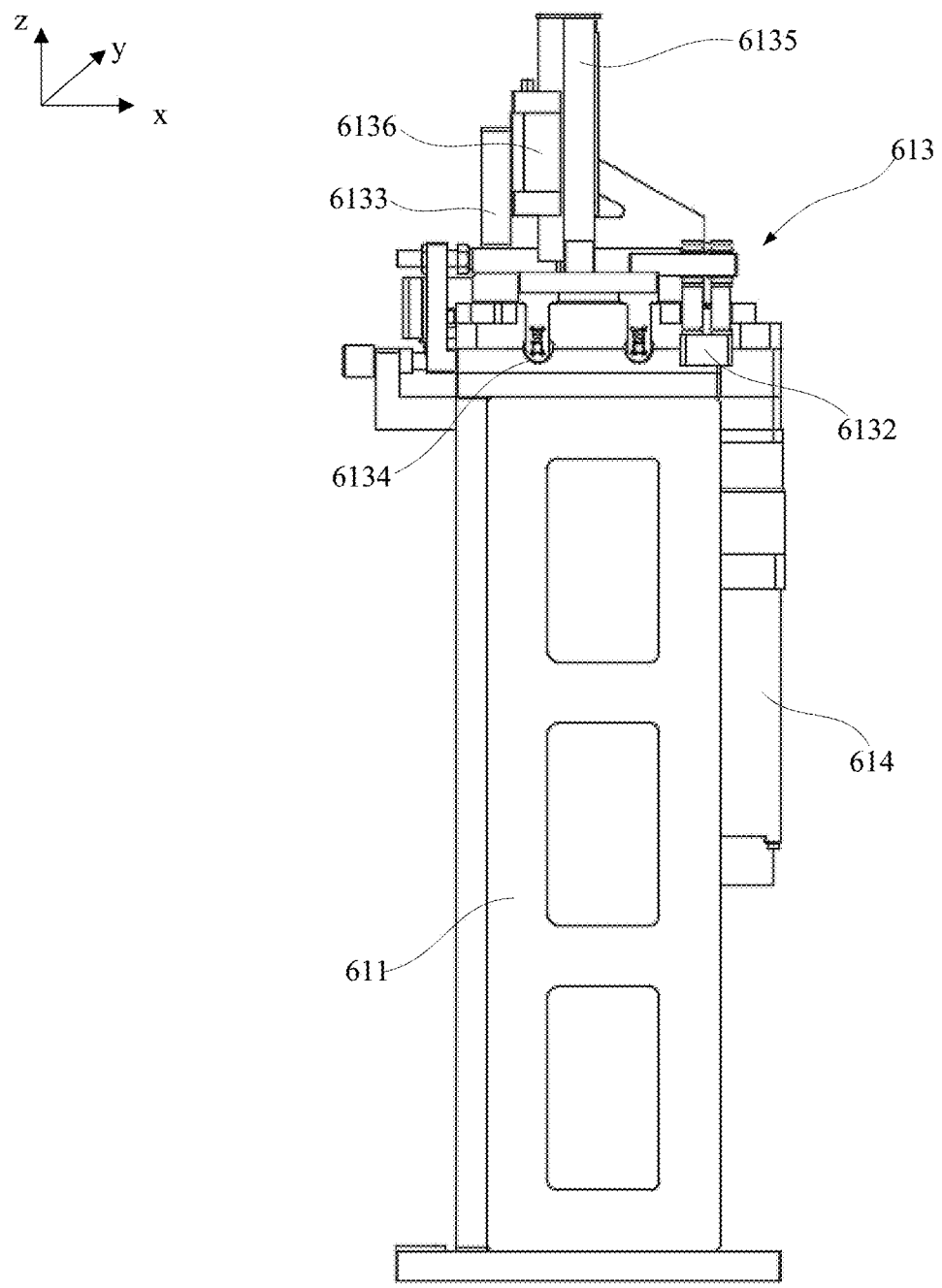
FIG. 22 is a front view of the waste material suction mechanism shown in FIG. 21.
Figure 23:
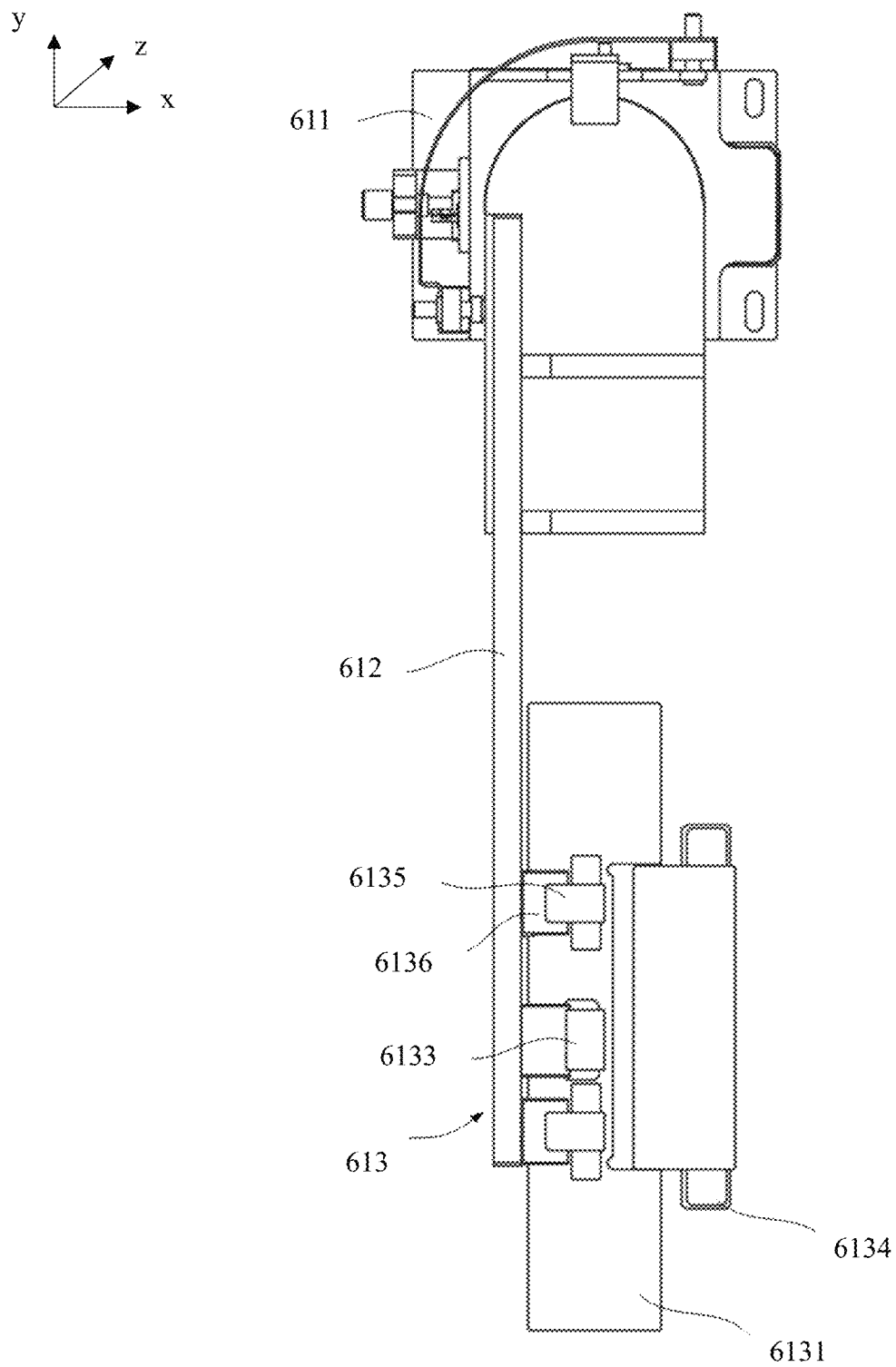
FIG. 23 is a top view of the waste material suction mechanism shown in FIG. 21.
Figure 24:
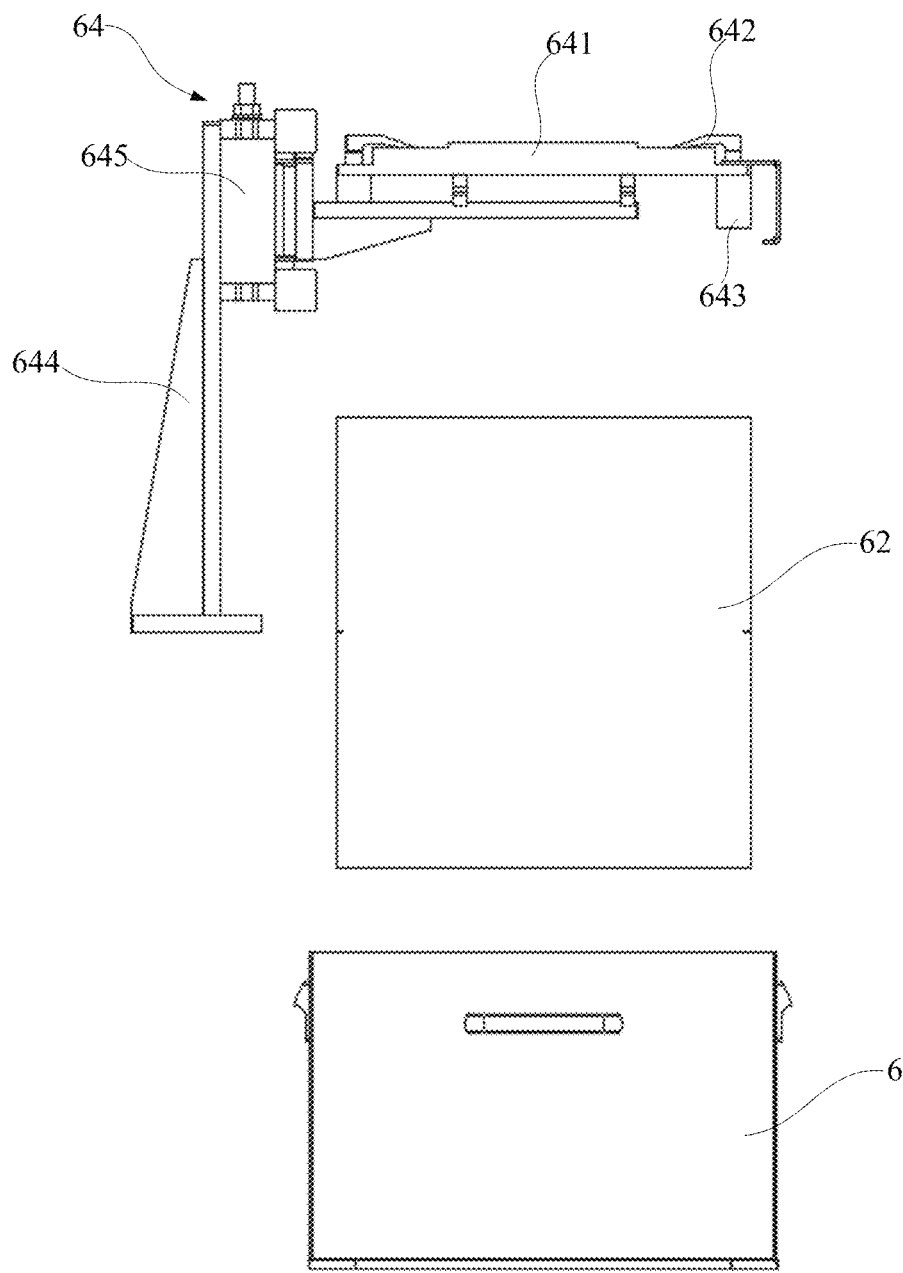
FIG. 24 is a schematic structural diagram of a material pressing mechanism, a waste material channel, and a waste material collection box of the waste material disposal assembly of the film wrapping equipment shown in FIG. 1.

It should be noted that, when the strip cutting assembly 40 is used to cut off the material strip between the film wrapping rollers 11 and the film pulling assembly 20, a material strip clamped by the film pulling assembly 20 is a waste material. In order to prevent the waste material from affecting a next pulling action of the film pulling assembly 20, the waste material needs to be removed and collected. Please refer to FIGS. 21 to 23, in order to remove the waste material, in the embodiment of the present application, the film wrapping equipment further includes a waste material disposal assembly. The waste material disposal assembly includes a waste material suction mechanism 613 and a motion driving mechanism. The motion driving mechanism is drivingly connected to the waste material suction mechanism 613, so as to drive the waste material suction mechanism 613 to move between a material suction position and a waste material collection position.

When the waste material suction mechanism 613 moves to the material suction position, the waste material suction mechanism 613 is located between the film wrapping assembly 10 and the film pulling assembly 20, so as to suck the waste material formed after the strip cutting assembly 40 cuts off the material strip. When the waste material suction mechanism 613 moves to the waste material collection position, the waste material suction mechanism 613 releases the waste material, so as to make the waste material be collected to the waste material collection position.

This way, when the material strip needs to be cut off, the waste material suction mechanism 613 moves to the material suction position, so that the waste material suction mechanism 613 is used to suction the material strip between the film wrapping assembly 10 and the film pulling assembly 20. Then, the strip cutting assembly 40 is used to cut off the material strip between the film wrapping assembly 10 and the film pulling assembly 20, and the film pulling assembly 20 releases the waste material, and at this time, the waste material is sucked onto the waste material suction mechanism 613. And then, the waste material suction mechanism 613 moves to the waste material collection position and releases the waste material to the waste material collection position.

Specifically, in the embodiment, the motion driving mechanism includes a fixed frame 611, a swing arm 612, and a swing driving member 614. One end of the swing arm 612 is rotatably connected to the fixed frame 611, and the waste material suction mechanism 613 is mounted on another end of the swing arm 612, so that the waste material suction mechanism 613 can swing between the material suction position and the waste material collection position with the swing arm 612. The swing driving member 614 is mounted on the fixed frame 611 and is drivingly connected to the swing arm 612, so as to drive the swing arm 612 to swing relative to the fixed frame 611. Alternatively, the swing driving member 614 may adopt the motor.

Specifically, in the embodiment, the waste material suction mechanism 613 includes a mounting frame 6131, a vacuum suction plate 6132, and a suction driving member 6133. The mounting frame 6131 is movably connected to the swing arm 612 along the third direction, and the vacuum suction plate 6132 is mounted on the mounting frame 6131. The suction driving member 6133 is mounted on the swing arm 612 and is drivingly connected to the mounting frame 6131, so as to drive the mounting frame 6131 and the vacuum suction plate 6132 on the mounting frame 6131 to extend outwardly or retract inwardly along the third direction. When the waste material suction mechanism 613 swings to the material suction position, the suction driving member 6133 drives the mounting frame 6131 to move along the third direction, so that the vacuum suction plate 6132 extends to the material strip, until the material strip is sucked. When the material strip is cut off, the suction driving member 6133 drives the mounting frame 6131 to reset along the third direction to make the vacuum suction plate 6132 sucked with the waste material be retracted, and then the waste material suction mechanism 613 swings to the waste material collection position with the swing arm 612, the waste material is released to the waste material collection position. Alternatively, the suction driving member 6133 may adopt the cylinder.

Furthermore, the swing arm 612 is equipped with a fifth sliding block 6136, and the mounting frame 6131 is arranged with a fifth sliding rail 6135 extending longitudinally along the third direction, and the fifth sliding block 6136 is slidably connected to the fifth sliding rail 6135. This way, sliding cooperation of the fifth sliding block 6136 and the fifth sliding rail 6135 is used to guide movement of the mounting frame 6131 along the third direction.

Furthermore, the waste material suction mechanism 613 further includes two material pressing rollers 6134 mounted on the mounting frame 6131. The two material pressing rollers 6134 are arranged corresponding to the two film wrapping rollers 11 one-to-one. When the waste material suction mechanism 613 swings to the material suction position, and the suction driving member 6133 drives the vacuum suction plate 6132 to extend to the material strip, each material pressing roller 6134 presses the material strip onto the corresponding film wrapping roller 11 tightly. This way, the pressing rollers 6134 are used to press the material strip onto the film wrapping rollers 11, and then the strip cutting assembly 40 cuts off the material strip, which is conducive to improving cutting quality, ensuring that a distance between one end of the material strip and a top surface of the product meets process requirements, and further improving film wrapping accuracy.

In some embodiments, the waste material disposal assembly further includes a material pressing mechanism 64 arranged on the waste material collection position. The material pressing mechanism 64 includes a bearing plate 641, a material pressing block 642, and a material pressing driving member 643. The bearing plate 641 is used to bear the waste materials released from the above-mentioned vacuum suction plate 6132 to the waste material collection position. The material pressing block 642 is rotatably connected to an edge of the bearing plate 641, and the material pressing driving member 643 is mounted on the bearing plate 641 and is drivingly connected to the material pressing block 642, so as to drive the material pressing block 642 to rotate relative to the bearing plate 641. Wherein, a material pressing state of pressing the waste material onto the bearing plate 641 and an avoidance state of releasing pressing of the waste material onto the bearing plate 641 are provided in a rotating process of the material pressing block 642. This way, the bearing plate 641 is used to bear the waste material released from the vacuum suction plate 6132, and the material pressing block 642 is used to press the waste material onto the bearing plate 641 tightly. Alternatively, the material pressing driving member 643 may adopt the cylinder.

Specifically, in the embodiment, the waste material disposal assembly further includes a waste material collection box 63 arranged below the material pressing mechanism 64. The bearing plate 641 can be reversibly arranged. When there are enough waste materials on the bearing plate 641, the bearing plate 641 will be reversed, so that the waste materials on the bearing plate 641 face downward. At this time, the material pressing block 642 rotates to an escaping position, making the waste materials fall in the waste material collection box 63.

Specifically, in the embodiment, the material pressing mechanism 64 further includes a fixed bracket 644 and a reversing driving member 645. The bearing plate 641 is rotatably connected to the fixed bracket 644, and the reversing driving member 645 is mounted on the fixed bracket 644 and is drivingly connected to the bearing plate 641, so as to drive the bearing plate 641 to reverse (i.e., reverse 1800).

Specifically, in the embodiment, a waste material channel 62 is arranged between the material pressing mechanism 64 and the waste material collection box 63. The waste materials fall from the bearing plate 641, enters the waste material channel 62, and then slides through the waste material channel 62 to the waste material collection box 63.

A film wrapping process of the film wrapping equipment of the present application is described below in combination with the accompanying drawings (for convenience of description, it is described in the direction shown in FIG. 1):

Firstly, the strip pulling moving seat 22 moves to a left side, until the two strip clamping mechanisms 21 clamp a material strip located on a left side of the film wrapping assembly 10. The strip pulling moving seat 22 moves to a right side, until the two strip clamping mechanisms 21 pulls the material strip to pass through the two film wrapping rollers 11 and the first product clamping mechanism, and move to a right side of the film wrapping assembly 10.

Then, the first product clamping mechanism clamps a product to be film wrapped to move downward, making the product be gradually inserted into the film wrapping channel 110. In addition, the material strip is adhered to a bottom surface and left and right surfaces of the product under a rolling action of the two film wrapping rollers 11. When a bottom end of the product passes through bottom portions of the two film wrapping rollers 11, the second product clamping mechanism 32 clamps the bottom end of the product and moves downward together with the first product clamping mechanism, making the product continue to pass through the film wrapping channel 110.

When the first product clamping mechanism contacts or is about to contact the film wrapping rollers 11, the first product clamping mechanism and the second product clamping mechanism 32 discontinue to move downward. The first product clamping mechanism releases the product and moves upward to reset. The waste material suction mechanism 613 moves to an upper side of the two film wrapping rollers 11, and the vacuum suction plate 6132 is used to suck a material strip between a right film wrapping roller 11 and the film pulling assembly 20, and the two material pressing rollers 6134 press the material strip onto the two film wrapping rollers 11 tightly. The cutter mechanism 43 moves along an axial direction of the film wrapping rollers 11, so as to cut off the material strip located on a left side and a right side of the two film wrapping rollers 11.

And then, the two strip clamping mechanisms 21 release the waste material, the vacuum suction plate 6132 and the material pressing rollers 6134 move upward and swing to the waste material collection position with the swing arm 612 for waste material collection and disposal. At a same time, the second product clamping mechanism 32 continues to clamp the product to move downward, until the product passes through the film wrapping channel 110 to the unloading position.

And then, the two third clamping structures 53 clamp the product completing the film wrapping at the unloading position, the second product clamping mechanism 32 releases the product. The third clamping structures 53 drive the product to move to the removal position, so as to realize removal of the product.

Technical features of the above-described embodiments can be combined arbitrarily. In order to simplify the description, all possible combinations of the technical features in the above-described embodiments are not all described. However, as long as there is no contradiction in the combination of these technical features, it should be considered as the scope recorded in this specification.

The above-mentioned embodiments only represent several embodiments of the present application, and the descriptions are relatively specific and detailed, but should not be construed as limiting a scope of the present application. It should be pointed out that for those skilled in the art, without departing from a concept of the present application, several modifications and improvements can be made, which all belong to a protection scope of the present application. Therefore, the protection scope of the patent of the present application shall be subject to appended claims.

What is claimed is:

1. A film wrapping equipment, comprising:
    a film wrapping assembly comprising two film wrapping rollers arranged opposite to each other in a first direction, and a film wrapping channel for a product to pass through formed between the two film wrapping rollers;
    a film pulling assembly arranged on one side of the film wrapping assembly in the first direction and used to grab a material strip located on one side of the film wrapping assembly away from the film pulling assembly and pull the material strip along the first direction to move to one side of the film wrapping assembly facing the film pulling assembly, the material strip being a film for wrapping the product;

a product loading assembly used to grab the product and drive the product to pass through the film wrapping channel; and a strip cutting assembly used to cut off parts of the material strip located on two sides of the two film wrapping rollers in the first direction;

wherein the two film wrapping rollers are configured to move close to each other or move away from each other along the first direction, the film wrapping assembly further comprises a film wrapping driving member and a film wrapping transmission mechanism connected to the film wrapping driving member by transmission, the film wrapping transmission mechanism is connected between the two film wrapping rollers by transmission, so that the two film wrapping rollers are driven by the film wrapping driving member to move close to each other or move away from each other along the first direction, the film wrapping transmission mechanism comprises a film wrapping fixed seat, a cam slot plate, two cam followers, and two film wrapping mounting seats, wherein the film wrapping driving member is mounted on the film wrapping fixed seat, and the cam slot plate is mounted on an output shaft of the film wrapping driving member, so as to be driven by the film wrapping driving member to rotate, the two film wrapping mounting seats are arranged close to each other or away from each other along the first direction, and the two film wrapping rollers are rotatably connected to the two film wrapping mounting seats around their own axes, respectively, and the two cam followers are mounted on the two film wrapping mounting seats respectively and are cooperated with a cam slot on the cam slot plate by transmission, so as to drive the two film wrapping mounting seats to move close to each other or move away from each other along the first direction during a rotating process of the cam slot plate.

2. The film wrapping equipment as claimed in claim 1, wherein the film pulling assembly comprises a strip pulling moving seat, and two strip clamping mechanisms both used to clamp the material strip; the strip pulling moving seat is controllably moved along the first direction, the two strip clamping mechanisms are arranged on the strip pulling moving seat at intervals along a second direction perpendicular to the first direction, and the two strip clamping mechanisms are configured to move close to each other or move away from each other along the second direction.

3. The film wrapping equipment as claimed in claim 2, wherein the film pulling assembly further comprises a strip pulling lifting seat arranged on the strip pulling moving seat; the strip pulling lifting seat is movable relative to the strip pulling moving seat along a third direction, and the two strip clamping mechanisms are arranged on the strip pulling lifting seat;

wherein the third direction is perpendicular to the first direction and the second direction.

4. The film wrapping equipment as claimed in claim 1, wherein the product loading assembly comprises a first product clamping mechanism and a second product clamping mechanism arranged opposite to each other in a third direction; the film wrapping assembly is located between the first product clamping mechanism and the second product clamping mechanism, and the third direction is perpendicular to the first direction; and the first product clamping mechanism is used to clamp the product and insert the product into the film wrapping channel along the third direction, and the second product clamping mechanism is used to clamp the product passing through the film wrapping channel and pull the product out to an unloading position along the third direction.

5. The film wrapping equipment as claimed in claim 4, wherein the first product clamping mechanism comprises a first lifting driving member, a first lifting seat, and a first clamping structure; the first lifting driving member is drivingly connected to the first lifting seat, so as to drive the first lifting seat to move along the third direction, and the first clamping structure is mounted on the first lifting seat and is used to clamp the product; and the second product clamping mechanism comprises a second lifting driving member, a second lifting seat, and a second clamping structure, the second lifting driving member is drivingly connected to the second lifting seat, so as to drive the second lifting seat to move along the third direction, and the second clamping structure is mounted on the second lifting seat and is used to clamp the product.

6. The film wrapping equipment as claimed in claim 4, wherein the film wrapping equipment further comprises a product removal assembly, and the product removal assembly comprises a clamping sub-structure and a removal driving structure; the removal driving structure is drivingly connected to the clamping sub-structure, so as to drive the clamping sub-structure to move between the unloading position and a removal position, and the clamping sub-structure is used to clamp the product at the unloading position.

7. The film wrapping equipment as claimed in claim 1, wherein the film wrapping equipment further comprises a waste material disposal assembly, and the waste material disposal assembly comprises a waste material suction mechanism and a motion driving mechanism; the motion driving mechanism is drivingly connected to the waste material suction mechanism, so as to drive the waste material suction mechanism to move between a material suction position and a waste material collection position; and when the waste material suction mechanism moves to the material suction position, the waste material suction mechanism is located between the film wrapping assembly and the film pulling assembly, so as to suck a waste material formed after the strip cutting assembly cuts off the material strip, and when the waste material suction mechanism moves to the waste material collection position, the waste material suction mechanism releases the waste material.

8. The film wrapping equipment as claimed in claim 1, wherein the strip cutting assembly comprises a strip cutting moving seat, a strip cutting driving member, and a cutter mechanism; the strip cutting moving seat is movably arranged along a second direction perpendicular to the first direction; the strip cutting driving member is drivingly connected to the strip cutting moving seat; and the cutter mechanism is mounted on the strip cutting moving seat, so as to cut the material strip as the cutter mechanism moves with the strip cutting moving seat along the second direction.

9. The film wrapping equipment as claimed in claim 8, wherein the cutter mechanism comprises a cutter fixed seat, a cutter quick removal seat, and a cutter; the cutter fixed seat is mounted on the strip cutting moving seat; the cutter quick removal seat is detachably connected to the cutter fixed seat; and the cutter is detachably connected to the cutter quick removal seat.

10. A film wrapping equipment, comprising:
a film wrapping assembly comprising two film wrapping rollers arranged opposite to each other in a first direction, and a film wrapping channel for a product to pass through formed between the two film wrapping rollers;
a film pulling assembly arranged on one side of the film wrapping assembly in the first direction and used to grab a material strip located on one side of the film wrapping assembly away from the film pulling assembly and pull the material strip along the first direction to move to one side of the film wrapping assembly facing the film pulling assembly, the material strip being a film for wrapping the product;
a product loading assembly used to grab the product and drive the product to pass through the film wrapping channel; and
a strip cutting assembly used to cut off parts of the material strip located on two sides of the two film wrapping rollers in the first direction;
wherein the product loading assembly comprises a first product clamping mechanism and a second product clamping mechanism arranged opposite to each other in a third direction, the film wrapping assembly is located between the first product clamping mechanism and the second product clamping mechanism, and the third direction is perpendicular to the first direction, and
the first product clamping mechanism is used to clamp the product and insert the product into the film wrapping channel along the third direction, and the second product clamping mechanism is used to clamp the product passing through the film wrapping channel and pull the product out to an unloading position along the third direction;
wherein the first product clamping mechanism comprises a first lifting driving member, a first lifting seat, and a first clamping structure, the first lifting driving member is drivingly connected to the first lifting seat to drive the first lifting seat to move along the third direction, and the first clamping structure is mounted on the first lifting seat and is used to clamp the product, and
the second product clamping mechanism comprises a second lifting driving member, a second lifting seat, and a second clamping structure, the second lifting driving member is drivingly connected to the second lifting seat to drive the second lifting seat to move along the third direction, and the second clamping structure is mounted on the second lifting seat and is used to clamp the product; and
wherein the film wrapping equipment further comprises a product removal assembly, and the product removal assembly comprises a clamping sub-structure and a removal driving structure, the removal driving structure is drivingly connected to the clamping sub-structure to drive the clamping sub-structure to move between the unloading position and a removal position, and the clamping sub-structure is used to clamp the product at the unloading position.

11. The film wrapping equipment as claimed in claim 10, wherein the film pulling assembly comprises a strip pulling moving seat, and two strip clamping mechanisms both used to clamp the material strip; the strip pulling moving seat is controllably moved along the first direction, the two strip clamping mechanisms are arranged on the strip pulling moving seat at intervals along a second direction perpendicular to the first direction, and the two strip clamping mechanisms are configured to move close to each other or move away from each other along the second direction.

12. The film wrapping equipment as claimed in claim 11, wherein the film pulling assembly further comprises a strip pulling lifting seat arranged on the strip pulling moving seat; the strip pulling lifting seat is movable relative to the strip pulling moving seat along a third direction, and the two strip clamping mechanisms are arranged on the strip pulling lifting seat;
wherein the third direction is perpendicular to the first direction and the second direction.

13. The film wrapping equipment as claimed in claim 10, wherein the film wrapping equipment further comprises a waste material disposal assembly, and the waste material disposal assembly comprises a waste material suction mechanism and a motion driving mechanism; the motion driving mechanism is drivingly connected to the waste material suction mechanism, so as to drive the waste material suction mechanism to move between a material suction position and a waste material collection position; and
when the waste material suction mechanism moves to the material suction position, the waste material suction mechanism is located between the film wrapping assembly and the film pulling assembly, so as to suck a waste material formed after the strip cutting assembly cuts off the material strip, and when the waste material suction mechanism moves to the waste material collection position, the waste material suction mechanism releases the waste material.

14. The film wrapping equipment as claimed in claim 10, wherein the strip cutting assembly comprises a strip cutting moving seat, a strip cutting driving member, and a cutter mechanism; the strip cutting moving seat is movably arranged along a second direction perpendicular to the first direction; the strip cutting driving member is drivingly connected to the strip cutting moving seat; and the cutter mechanism is mounted on the strip cutting moving seat, so as to cut the material strip as the cutter mechanism moves with the strip cutting moving seat along the second direction.

15. The film wrapping equipment as claimed in claim 14, wherein the cutter mechanism comprises a cutter fixed seat, a cutter quick removal seat, and a cutter; the cutter fixed seat is mounted on the strip cutting moving seat; the cutter quick removal seat is detachably connected to the cutter fixed seat; and the cutter is detachably connected to the cutter quick removal seat.

16. A film wrapping equipment, comprising:
a film wrapping assembly comprising two film wrapping rollers arranged opposite to each other in a first direction, and a film wrapping channel for a product to pass through formed between the two film wrapping rollers;
a film pulling assembly arranged on one side of the film wrapping assembly in the first direction and used to grab a material strip located on one side of the film wrapping assembly away from the film pulling assembly and pull the material strip along the first direction to move to one side of the film wrapping assembly facing the film pulling assembly, the material strip being a film for wrapping the product;
a product loading assembly used to grab the product and drive the product to pass through the film wrapping channel; and
a strip cutting assembly used to cut off parts of the material strip located on two sides of the two film wrapping rollers in the first direction, wherein the film wrapping equipment further comprises a waste material disposal assembly, and the waste material disposal assembly comprises a waste material suction mechanism and a motion driving mechanism; the motion driving mechanism is drivingly connected to the waste material suction mechanism, so as to drive the waste material suction mechanism to move between a material suction position and a waste material collection position, and when the waste material suction mechanism moves to the material suction position, the waste material suction mechanism is located between the film wrapping assembly and the film pulling assembly, so as to suck a waste material formed after the strip cutting assembly cuts off the material strip, and when the waste material suction mechanism moves to the waste material collection position, the waste material suction mechanism releases the waste material.

17. The film wrapping equipment as claimed in claim 16, wherein the film pulling assembly comprises a strip pulling moving seat, and two strip clamping mechanisms both used to clamp the material strip; the strip pulling moving seat is controllably moved along the first direction, the two strip clamping mechanisms are arranged on the strip pulling moving seat at intervals along a second direction perpendicular to the first direction, and the two strip clamping mechanisms are configured to move close to each other or move away from each other along the second direction.

18. The film wrapping equipment as claimed in claim 17, wherein the film pulling assembly further comprises a strip pulling lifting seat arranged on the strip pulling moving seat; the strip pulling lifting seat is movable relative to the strip pulling moving seat along a third direction, and the two strip clamping mechanisms are arranged on the strip pulling lifting seat;

wherein the third direction is perpendicular to the first direction and the second direction.

19. The film wrapping equipment as claimed in claim 16, wherein the strip cutting assembly comprises a strip cutting moving seat, a strip cutting driving member, and a cutter mechanism; the strip cutting moving seat is movably arranged along a second direction perpendicular to the first direction; the strip cutting driving member is drivingly connected to the strip cutting moving seat; and the cutter mechanism is mounted on the strip cutting moving seat, so as to cut the material strip as the cutter mechanism moves with the strip cutting moving seat along the second direction.

20. The film wrapping equipment as claimed in claim 19, wherein the cutter mechanism comprises a cutter fixed seat, a cutter quick removal seat, and a cutter; the cutter fixed seat is mounted on the strip cutting moving seat; the cutter quick removal seat is detachably connected to the cutter fixed seat; and the cutter is detachably connected to the cutter quick removal seat.

* * * * *